United States Patent [19]

Capshew

[11] 4,363,746
[45] Dec. 14, 1982

[54] COMPOSITION OF MATTER AND METHOD OF PREPARING SAME, CATALYST, METHOD OF PRODUCING THE CATALYST AND POLYMERIZATION PROCESS EMPLOYING THE CATALYST

[75] Inventor: Charles E. Capshew, Bartlesville, Okla.

[73] Assignee: Phillips Petroleum Company, Bartlesville, Okla.

[21] Appl. No.: 132,731

[22] Filed: Mar. 24, 1980

Related U.S. Application Data

[63] Continuation-in-part of Ser. No. 42,251, May 29, 1979, abandoned, which is a continuation-in-part of Ser. No. 927,079, Jul. 24, 1978, abandoned.

[51] Int. Cl.$^3$ ............................................. C08F 4/64
[52] U.S. Cl. ........................... 252/429 B; 252/429 C; 252/431 R; 526/125
[58] Field of Search ............ 252/429 C, 431 R, 429 B

[56] References Cited

U.S. PATENT DOCUMENTS

| | | | |
|---|---|---|---|
| 3,010,985 | 11/1961 | Ramsden | 260/448 |
| 3,094,568 | 6/1963 | Hay et al. | 252/429 B X |
| 3,316,314 | 4/1967 | van den Berg | 252/429 C X |
| 3,400,110 | 9/1968 | Dassesse et al. | 252/429 C X |
| 3,404,096 | 9/1968 | Lamborn | 252/429 B |
| 3,454,547 | 7/1969 | Delboville et al. | 252/429 C X |
| 3,526,616 | 9/1970 | Delboville et al. | 252/429 C X |
| 3,549,717 | 12/1970 | Itakura et al. | 252/429 B X |
| 3,591,656 | 7/1971 | Kroll | 252/429 C X |
| 3,594,330 | 7/1971 | Delboville et al. | 252/429 C |
| 3,642,746 | 2/1972 | Kashiwa et al. | 252/429 C X |
| 3,644,318 | 2/1972 | Diedrich et al. | 252/431 R X |
| 3,658,722 | 4/1972 | Delboville et al. | 252/429 C X |
| 3,784,481 | 1/1974 | Lassau et al. | 252/429 C X |
| 3,803,105 | 4/1974 | Galli et al. | 252/429 C X |
| 3,859,231 | 1/1975 | Kochhar et al. | 252/429 R |
| 3,901,863 | 8/1975 | Berger et al. | 526/114 |
| 3,953,414 | 4/1976 | Galli et al. | 252/429 C X |
| 4,039,472 | 8/1977 | Hoff | 252/429 C |
| 4,089,808 | 5/1978 | Zucchini et al. | 252/429 C |
| 4,105,846 | 8/1978 | Hoff et al. | 252/431 R |
| 4,190,555 | 2/1980 | Takamura et al. | 252/429 C |
| 4,208,304 | 6/1980 | Fahey | 252/429 C |
| 4,218,339 | 8/1980 | Zucchini et al. | 252/429 B |
| 4,239,650 | 12/1980 | Franke et al. | 252/429 C X |
| 4,295,991 | 10/1981 | Wristers | 252/429 B |

FOREIGN PATENT DOCUMENTS

| | | |
|---|---|---|
| 867400 | 11/1978 | Belgium . |
| 2311032 | 10/1976 | France . |
| 51-37195 | 3/1976 | Japan . |
| 78/2971 | 5/1978 | South Africa . |
| 1085679 | 10/1967 | United Kingdom . |
| 1401708 | 7/1975 | United Kingdom . |
| 1433537 | 4/1976 | United Kingdom . |
| 1434264 | 5/1976 | United Kingdom . |
| 1485520 | 9/1977 | United Kingdom . |
| 1490509 | 11/1977 | United Kingdom . |
| 1538472 | 1/1979 | United Kingdom . |
| 1539175 | 1/1979 | United Kingdom . |

*Primary Examiner*—Patrick Garvin

[57] ABSTRACT

A transition metal compound and a metal halide compound selected from metal dihalide compounds and metal hydroxyhalide compounds are chemically combined to form a composition of matter. The composition of matter is suitable for use with an organometallic compound to produce an active olefin polymerization catalyst. Exceptionally high polymer yields are realized per gram of catalyst when the catalyst is treated with a halide ion exchanging source and used with an organometallic cocatalyst.

31 Claims, No Drawings

COMPOSITION OF MATTER AND METHOD OF PREPARING SAME, CATALYST, METHOD OF PRODUCING THE CATALYST AND POLYMERIZATION PROCESS EMPLOYING THE CATALYST

This application is a continuation-in-part of copending application Ser. No. 042,251, filed May 29, 1979 and now abandoned, which is a continuation-in-part of application Ser. No. 927,079, filed July 24, 1978, now abandoned.

BACKGROUND

The invention relates to a composition of matter, a method of preparing same, catalyst, a method of producing the catalyst and a process of using the catalyst. In another aspect the invention relates to a particularly effective ethylene polymerization catalyst and process.

In the production of polyolefins, such as for example polyethylene, polypropylene, ethylene-butene copolymers etc., an important aspect of the various processes and catalysts used to produce such polymers is the productivity. By productivity is meant the amount or yield of solid polymer that is obtained by employing a given quantity of catalyst. If the productivity is high enough then the amount of catalyst residues contained in the polymer is low enough that the presence of the catalyst residues does not significantly affect the properties of the polymer and the polymer does not require additional processing to remove the catalyst residues. As those skilled in the art are aware, removal of catalyst residues from polymer is an expensive process and it is very desirable to employ a catalyst which provides sufficient productivity so that catalyst residue removal is not necessary.

In addition, high productivities are desirable in order to minimize catalyst costs. Therefore it is desirable to develop new and improved catalysts and polymerization processes which provide improved polymer productivities.

Accordingly, an object of the invention is a catalyst. Another object of the invention is a polymerization process for using the catalyst capable of providing improved polymer productivities as compared to prior art catalysts.

Another object of the invention is a catalyst and a polymerization process in which the polymer produced contains catalyst residues in an amount so that catalyst residue removal is unnecessary.

SUMMARY

In accordance with the invention a composition of matter comprises the chemical combination of a metal halide compound and a transition metal compound.

Further in accordance with the invention a method for producing the above composition is provided.

Further in accordance with the invention a catalyst is provided which forms on mixing the above composition of matter as a first catalyst component and as a second catalyst component a precipitating agent.

Further, in accordance with the invention, at least one polymerizable compound selected from aliphatic mono-1-olefins, conjugated diolefins and vinylaromatic compounds is polymerized under polymerization conditions employing the catalyst described above. In a preferred embodiment, the catalyst is treated with a halide ion exchanging source and the polymerization reaction is carried out employing an organometallic cocatalyst.

Further in accordance with the invention, the above-described catalyst is prepared by mixing together a metal halide compound and a transition metal compound in a suitable solvent to produce a first catalyst component solution, the first catalyst component solution is heated, cooled and optionally filtered in order to remove any undissolved material; a second catalyst component comprising a precipitating agent is added to the above-described first catalyst component solution in a manner so as to avoid a significant temperature rise in the solution to produce a solid catalyst in the form of a slurry with the hydrocarbon solvent; and the solid catalyst is separated from the slurry, washed with a hydrocarbon compound and dried, wherein all the above steps are carried out in the essential absence of air and water.

DETAILED DESCRIPTION OF THE INVENTION

The present invention is based at least in part on the discovery of a novel composition of matter resulting from the chemical combination of a metal halide compound and a transition metal compound wherein the metal halide compound is selected from metal dihalides and metal hydroxyhalides and the metal of the metal halide compound is selected from Group IIA and Group IIB metals of the Mendeleev Periodic Table and wherein the transition metal of the transition metal compound is selected from Group IVB and Group VB transition metals of the Mendeleev Periodic Table and the transition metal is bonded to at least one atom selected from oxygen, nitrogen and sulfur, and said oxygen, nitrogen and sulfur atoms are in turn bonded to a carbon atom of a carbon containing radical. As used herein the term "Mendeleev Periodic Table" is meant the Periodic Table of the Elements as shown in the inside front cover of Perry, *Chemical Engineer's Handbook*, 4th Edition, McGraw Hill & Co. (1963).

As noted above the metal compound is selected from metal dihalide compounds and metal hydroxyhalide compounds and the metal of the metal halide compound is selected from Group IIA and Group IIB metals, such as for example beryllium, magnesium, calcium and zinc. Some suitable metal halide compounds include for example, beryllium dichloride, beryllium dibromide, beryllium hydroxyiodide, magnesium dichloride, magnesium bromide, magnesium hydroxychloride, magnesium diiodide, magnesium difluoride, calcium dichloride, calcium dibromide, calcium hydroxybromide, zinc dichloride, zinc difluoride, and zinc hydroxychloride. While metal hydroxyhalide compounds are known in the art, they are not as common and as readily available as metal dihalide compounds; therefore, metal dihalides are preferred. Of the metal dihalides, magnesium dihalides, and particularly magnesium dichloride is preferred because it is readily available and relatively inexpensive and has provided excellent results. The metal dihalide component is generally used in the form of an anhydrous, particulate solid to facilitate its reaction with the transition metal compound. It is also noted that various techniques for converting a metal halide compound to a fine particulate form, such as for example roll milling, reprecipitating, etc., can be used to prepare the metal halide compound for use according to the present invention and that such additional preparation of the metal halide compound promotes the reaction of the metal halide compound with the transition metal compound; however, it does not appear to make any difference in a catalyst of the present invention prepared from a composition of matter of the present invention if the metal halide compound is in a fine particulate form, that is, polymer productivity for example is not a function of the size of the particles of the metal halide compound. Preparation of metal hydroxyhalide compounds are described in K. Soga, S. Katano, Y. Akimoto and T. Kagiya, "Polymerization of alpha-Olefins with Supported Ziegler-type Catalysts", *Polymer Journal*, Vol. 2, No. 5, pp. 128–134 (1973).

The transition metal of the transition metal compound noted above is selected from Group IVB and Group VB transition metals and is generally selected from titanium, zirconium, and vanadium although other transition metals can be employed. Excellent results have been obtained with titanium compounds and they are preferred. Some of the titanium compounds suitable for use in the invention include for example titanium tetrahydrocarbyloxides, titanium tetraimides, titanium tetraamides and titanium tetramercaptides. Other transition metal compounds include for example zirconium tetrahydrocarbyloxides, zirconium tetraimides, zirconium tetraamides, zirconium tetramercaptides, vanadium tetrahydrocarbyloxides, vanadium tetraimides, vanadium tetraamides and vanadium tetramercaptides.

The titanium tetrahydrocarbyloxides are the preferred titanium compounds because they produce excellent results and are readily available. Suitable titanium tetrahydrocarbyloxide compounds include those expressed by the general formula $Ti(OR)_4$ wherein each R is individually selected from an alkyl, cycloalkyl, aryl, alkaryl, and aralkyl hydrocarbon radical containing from about 1 to about 20 carbon atoms per radical and each R can be the same or different. Titanium tetrahydrocarbyloxides in which the hydrocarbyl group contains from about 1 to about 10 carbon atoms per radical are most often employed because they are more readily available. Suitable titanium tetrahydrocarbyloxides include, for example, titanium tetramethoxide, titanium dimethoxydiethoxide, titanium tetraethoxide, titanium tetra-n-butoxide, titanium tetrahexyloxide, titanium tetradecyloxide, titanium tetraeicosyloxide, titanium tetracyclohexyloxide, titanium tetrabenzyloxide, titanium tetra-p-tolyloxide and titanium tetraphenoxide.

Of the titanium tetrahydrocarbyloxides, titanium tetraalkoxides are generally preferred and titanium tetraethoxide is particularly preferred because of the excellent results obtained employing this material. Titanium tetraethoxide is also generally available at a reasonable cost.

The molar ratio of the transition metal compound to the metal halide compound can be selected over a relatively broad range. Generally the molar ratio is within the range of about 10:1 to about 1:10, however, the most common molar ratios are within the range of about 2:1 to about 1:2. When titanium tetrahydrocarbyloxide and magnesium dichloride are employed to form a composition of matter of the invention, a molar ratio of titanium to magnesium of about 2:1 is presently recommended as all the magnesium compound apparently goes into solution easily.

The metal halide compound and the transition metal compound employed in the present invention are normally mixed together by heating, e.g. refluxing, these two components together in a suitable dry (essential absence of water) solvent or diluent, which is essentially inert to the these components and the product produced. By the term "inert" is meant that the solvent does not chemically react with the dissolved components such as to interfere with the formation of the product or the stability of the product once it is formed. Such solvents or diluents include, for example, n-pentane, n-heptane, methylcyclohexane, toluene, xylenes and the like. It is emphasized that aromatic solvents are preferred, such as for example xylene because the solubility of the metal halide compound and the transition metal compound is higher in aromatic solvents as compared to aliphatic solvents, particularly at low temperatures, which as described hereinafter, are preferred when mixing the metal halide compound and the transition metal compound in the solvent with an organometallic compound. Such mixing temperatures are generally within the range of from about 0° C. to about −100° C. and preferably from about 31 15° C. to about −40° C. It is also noted that as compared to aliphatic solvents the use of aromatic solvents, such as for example xylene, appears to improve production of larger polymer particles and/or polymer particles with improved resistance to attrition when the composition resulting from the chemical combination of the metal halide compound and the transition metal compound is used to produce a polymerization catalyst as described herein. Generally the amount of solvent or diluent employed can be selected over a broad range. Usually the amount of solvent or diluent is within the range of about 20 to about 100 cc per gram of metal dihalide. The temperature employed during the heating step can also be selected over a broad range. Normally the heating temperature is within the range of about 15° C. to about 150° C. when the heating step is carried out at atmospheric pressure. Obviously the heating temperatures employed would be higher if the pressure employed is above atmospheric pressure. The pressure employed during the heating step does not appear to be a significant parameter. In addition to the above noted solvents or diluents, more polar solvents or diluents such as nitrobenzene and halogenated hydrocarbons, e.g. methylene chloride, chlorobenzene and 1,2-dichloroethane can be used, particularly when producing compositions of the invention having a molar ratio of the transition metal compound to the metal dihalide compound of other than 2:1. In addition, normal saturated alkanols, such as, for example, ethanol, n-butanol and the like, and saturated ethers particularly saturated cyclic ethers such as, for example, tetrahydrofuran, can be used alone or in combination with the previously mentioned solvents or diluents in producing catalyst compositions according to the invention. Mixed solvents or diluents, such as for example, a mixture of n-hexane and tetrahydrofuran having a volume/volume ratio of, for example, about 50/50 can be employed in solubilizing hydrocarbon-soluble metal dihalides which are relatively difficult to solubilize, such as, for example, zinc dichloride and the like. Other suitable mixtures of two or more of the above solvents to solubilize the reagents of the first catalyst component can of course also be used and can be readily determined by one of ordinary skill in the art.

Generally, the time required for heating these two components together is within the range of about 5 minutes to about 10 hours, although in most instances a time within the range of about 15 minutes to about 3 hours is sufficient. Following the heating operation, the resulting solution can be filtered to remove any undissolved material or extraneous solid, if desired. The composition of matter of the present invention thus produced and which is in solution can be recovered from the solvent or diluent by crystallation or other suitable means.

It is also emphasized that the compositions of matter of the present invention are prepared in an oxygen free system e.g., absence of air as well as a dry system i.e., absence of water. Generally a dry box is employed as known in the art to prepare the compositions of the present invention usually employing a dry oxygen free nitrogen atmosphere.

With repsect to the compositions of matter of the present invention the following example is provided for purposes of illustration.

EXAMPLE I (First Catalyst Component Preparation)

Preparation of a composition of the invention was carried out by reacting 2 moles of titanium tetraethoxide and 1 mole of magnesium dichloride in hydrocarbon solution. All mixing, filtering and washing operations were conducted in a dry box under a nitrogen atmosphere. Anhydrous, powdered magnesium dichloride amounting to 4.758 g (0.050 mole) was roll milled and mixed with 23.010 g (0.101 mole) of titanium tetraethoxide in 200 ml of dry n-heptane in a flask equipped for stirring and refluxing. Under a nitrogen purge, the mixture was stirred, heated to refluxing temperature, refluxed for 45 minutes and cooled to room temperature to yield a solution containing a very small amount of undissolved residue. The reaction mixture was suction filtered to remove the residue to obtain a clear, colorless solution. The solution contained in a flask was first cooled in an ice bath to a temperature of about 0° C. and then to a temperature of about $-22°$ C. using a freezer to yield a relatively small crop of crystals. To increase the yield, the mother liquor was heated to boiling under a nitrogen purge to remove about $\frac{1}{3}$ of the volume by evaporation. The resulting solution was cooled to room temperature, then to $-22°$ C. and finally to about $-78°$ C. in a dry ice-isopropanol bath for about 1 hour. The mother liquor was pumped off the crystals that had formed and the crystals were rinsed off with three 20 ml portions of dry n-hexane cooled to about $-78°$ C. The liquid remaining after the last rinse was pumped off and the product was dried overnight under a nitrogen purge to obtain 23.6 g of white crystals amounting to 85% of the theoretical yield.

Elemental analysis of a portion of the composition was performed with the following results, in terms of wt. %.

|  | C | H | Cl | Mg | Ti | O |
|---|---|---|---|---|---|---|
| Calculated | 34.84 | 7.32 | 12.85 | 4.41 | 17.37 | 23.21 |
| Found | 32.02 | 7.21 | 13.3 | 3.88 | 17.3 | — |

The results indicate that a composition having a formula consistent with $2Ti(OC_2H_5)_4 \cdot MgCl_2$ was formed and recovered. Thus the composition apparently had a molar ratio of two moles of titanium to one mole of magnesium.

A sample of the white crystals was analyzed by powder X-ray diffraction under conditions to exclude the presence of air and water. The sample revealed the following characteristics:

TABLE I

| interplanar spacing (Meter $\times 10^{-10}$) | relative intensity of spectrum |
|---|---|
| 10.77 | weak |
| 10.47 | very strong |
| 9.28 | very weak |
| 8.73 | weak |
| 8.23 | very strong |
| 8.10 | moderate |
| 7.91 | very strong |
| 7.43 | strong |
| 7.27 | strong |
| 6.52 | weak |
| 6.41 | weak |
| 6.10 | weak |
| 4.90 | very weak |
| 4.42 | very weak |
| 4.40 | very weak |
| 4.09 | very weak |
| 3.86 | very weak |

The interplanar spacing lines were sharp and in view of the above number of interplanar spacings it is apparent that the composition formed has essentially a crystalline structure.

The catalysts of the present invention are made up of two components. The first catalyst component comprises a composition of matter as described above and the second catalyst component comprises a precipitating agent. Particularly effective catalysts have been obtained by treating the above-described catalyst comprising said first catalyst component and said second catalyst component with a halide ion exchanging source, such as for example titanium tetrahalide. For convenience, the designation "catalyst A" refers to those catalysts which have not been treated with a halide ion exchanging source and the term "catalyst B" refers to those catalysts which have been so treated. In other words, catalyst B is catalyst A which is treated with a halide ion exchanging source. It has also been found desirable to employ either catalyst A or catalyst B with a cocatalyst comprising an organometallic compound.

The metal halide compounds and the transition metal compounds suitable for producing the composition of matter of the present invention which is used as the first catalyst component of the present invention were described above as was the general and specific nature of the composition of matter. It is noted that the composition of matter of the present invention need not be recovered from the diluent or solvent, such as by crystallation, prior to using such material to produce the catalysts of the present invention. Good results have been obtained by employing the first catalyst component solution which was produced when the composition of matter was prepared as well as by employing composition of matter of the present invention recovered from the diluent or solvent.

The second catalyst component is a precipitating agent selected from the group consisting of organometallic compounds in which the metal is selected from metals of Groups I to III of the Mendeleev Periodic Table, metal halides and oxygen-containing halides of elements selected from Groups IIIA, IVA, IVB, VA, and VB of the Mendeleev Periodic Table, hydrogen halides, and organic acid halides expressed as

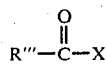

wherein R''' is an alkyl, aryl, cycloalkyl group or combinations thereof containing from 1 to about 12 carbon atoms and X is a halogen atom.

Some organometallic compounds in which the metal is selected from metals of Group I, Group II, and Group III of the Mendeleev Periodic Table suitable for use as the second component include, for example, lithium alkyls, Grignard reagents, dialkyl magnesium compounds, dialkyl zinc compounds, organoaluminum compounds, etc. The organometallic compound of the second catalyst component is generally an organoaluminum halide compound which includes for example, dihydrocarbylaluminum monohalides of the formula $R'_2AlX$, monohydrocarbylaluminum dihalides of the formula $R'AlX_2$ and hydrocarbylaluminum sesquihalides of the formula $R'_3Al_2X_3$ wherein each R' in the above formulas is individually selected from linear and branched chain hydrocarbyl radicals containing from 1 to about 20 carbon atoms per radical and can be the same or different and each X is a halogen atom and can be the same or different. Some suitable organoaluminum halide compounds include, for example, methylaluminum dibromide, ethylaluminum dichloride, ethylaluminum diiodide, isobutylaluminum dichloride, dodecylaluminum dibromide, dimethylaluminum bromide, diethylaluminum chloride, diisopropylaluminum chloride, methyl-n-propylaluminum bromide, di-n-octylaluminum bromide, diphenylaluminum chloride, dicyclohexylaluminum bromide, dieicosylaluminum chloride, methylaluminum sesquibromide, ethylaluminum sesquichloride, ethylaluminum sesquiiodide, and the like. Ethylaluminum sesquichloride, ethylaluminum dichloride, and diethylaluminum chloride have been employed with good results and are preferred. The most preferred organoaluminum halide compound is ethylaluminum sesquichloride, which produced the best results.

Some metal halides and oxygen-containing halides of elements selected from Groups IIIA, IVA, IVB, VA, and VB suitable for use as the second component preferably include such as, for example, aluminum tribromide, aluminum trichloride, aluminum triiodide, tin tetrabromide, tin tetrachloride, silicon tetrabromide, silicon tetrachloride, phosphorous oxychloride, phosphorous trichloride, phosphorous pentabromide, vanadium tetrachloride, vanadium oxytrichloride, vanadyl trichloride, zirconium tetrachloride, and the like.

The hydrogen halides suitable for use as the second catalyst component include preferably such as, for example, hydrogen chloride, hydrogen bromide, and the like.

The organic acid halides suitable for use as the second catalyst component preferably include such as, for example, acetyl chloride, propionyl fluoride, dodecanoyl chloride, 3-cyclopentylpropionyl chloride, 2-naphthoyl chloride, benzoyl bromide, benzoyl chloride, and the like.

As indicated above, in one embodiment of the invention, the catalyst A composition formed by the reaction between the first component and the second component can be recovered and used in polymerization preferably in combination with a cocatalyst comprising an organometallic compound as herein defined.

In another embodiment, as further indicated above, the catalyst A compositions of the instant invention can be treated with a halide ion exchanging source, such as for example titanium tetrachloride, preferably titanium tetrachloride because of its efficacy in the process to further enhance the catalytic activity of the compositions for polymerization to produce catalyst B compositions.

While it may not be necessary in all instances to employ a cocatalyst with the catalyst of the present invention, the use of cocatalysts is recommended for best results. The organometallic cocatalysts suitable for use in accordance with the invention are the same as the organometallic compounds suitable for use as the second component of the catalyst of the present invention previously described and in addition to organometallic compounds represented by the general formulas $R''AlX_2$, $R''_2AlX$ and $R''_3Al_2X_3$, suitable cocatalysts also include compounds of the formula $R''_3Al$ in which R'' is the same as R' defined above. Of the organometallic cocatalysts, the organoaluminum cocatalysts are preferred and in addition to those described above as suitable for use as the second component of the catalyst the additional organoaluminum compounds of the formula $R''_3Al$ include, for example, trimethylaluminum, triethylaluminum, triisopropylaluminum, tridecylaluminum, trieicosylaluminum, tricyclohexylaluminum, triphenylaluminum, 2-methylpentyldiethylaluminum, and triisoprenylaluminum. Triethylaluminum is preferred since this compound produced excellent results in the runs hereafter described.

The metal halide compound/transition metal compound solution described above (which is formed by dissolving the recovered composition of matter of the present invention in a suitable solvent or which is formed initially without recovering the composition of matter from the solvent) is then contacted with hydrocarbon solution containing the second component of the catalyst. A solid reaction product is formed which precipitates out of the solution.

The molar ratio of the transition metal compound of the first catalyst component to the second catalyst component can be selected over a relatively broad range. Generally, the molar ratio of the transition metal of the first catalyst component to the second catalyst component is within a range of from about 10:1 to about 1:10 and more generally within a range of about 2:1 to about 1:3 since a molar ratio within the latter range usually produces a catalyst which can be employed as an especially active ethylene polymerization catalyst.

The temperature employed while mixing the first and second catalyst components as above described can be selected over a broad range. Generally the temperature employed is within a range of about $-100°$ C. to about 50° C. or higher, while temperatures within the range of $-10°$ C. to about 30° C. were most often employed, additional investigation has surprisingly established that the use of a temperature within the range of about $-100°$ C. to about 0° C. for mixing the first and second catalyst components together results in the production of larger polymer particles and/or polymer particles with improved resistance to attrition as compared to polymer produced with a catalyst where the first and second catalyst components were mixed together at a temperature above 0° C. As the data hereinafter indicates polymer particles of good size were produced employing a mixing temperature for the first and second catalyst components within the range of from about −15° C. to about −40° C. and mixing temperatures within this range are preferred. Since heat is evolved when the first catalyst component and the second catalyst component are mixed, the mixing rate is adjusted as required and additional cooling is employed in order to maintain a relatively constant mixing temperature. It is noted with respect to mixing the first and second components that the order of addition is not important and either component can be added to the other. After completing the mixing, the resulting slurry is stirred or agitated for a sufficient time, generally within a range of about 15 minutes to about 5 hours to insure that mixing of the components is complete. It is recommended that the stirring or agitation be carried out whereby the slurry is maintained at the mixing temperature for the first 10 to about 30 minutes after mixing and then gradually raising the temperature of the slurry to ambient temperature for the remainder of the stirring or agitation period. Thereafter, stirring is discontinued and the solid product recovered by filtration, decantation, and the like. The product is then washed with a suitable material such as a hydrocarbon, e.g., n-pentane, n-heptane, cyclohexane, benzene, xylenes and the like, to remove any soluble material which may be present. The product is then dried and stored under dry nitrogen. The products formed in this manner are designated as catalyst A as previously described.

In another aspect of the invention, the catalyst, previously designated as catalyst A, is treated with a halide ion exchanging source such as for example a halide of a transition metal in order to produce a catalyst of enhanced activity, referred to previously as catalyst B. Some examples of suitable halide ion exchanging sources that have been employed are titanium tetrachloride, vanadium oxychloride (VOCl$_3$) and zirconium tetrachloride. Because titanium tetrachloride is readily available and produced excellent results after somewhat extensive experimentation, it is preferred.

Generally, treating the catalyst with the halide ion exchanging source takes place in a suitable diluent such as a hydrocarbon diluent, for example, n-pentane, n-heptane, cyclohexane, benzene, xylenes, and the like, to facilitate the treating process. The treating temperature can be selected over a relatively broad range and is normally within a range of about 0° C. to about 200° C.; however, surprisingly it has also been found that employing a temperature within the range of about 80° C. to about 180° C. for treating catalyst A with a halide ion exchanging source to produce catalyst B, the use of such catalyst B results in the production of larger polymer particles and/or polymer particles with improved resistance to attrition as compared to polymer produced with a catalyst B prepared at a lower treating temperature. In view of the above discovery the preferred treating temperature for treating catalyst A with a halide ion exchanging source is from about 100° C. to about 130° C. when considering the over-all catalyst performance. While the use of treating temperatures in excess of 130° C., such as for example 150° C. to about 180° C., produces catalysts that provide larger and/or more attrition resistant polymer particles as compared to polymer particles produced with catalysts prepared at treating temperatures of 130° C. and below, catalysts produced with treating temperatures of about 150° C. to about 180° C. also show a marked reduction in productivity as compared to catalysts prepared at treating temperatures of 130° C. and below.

It is also noted that particularly good results have been obtained employing the low mixing temperatures for mixing the first and second catalyst components together as described above to produce catalyst A which is subsequently treated with a halide ion exchanging source employing the high treating temperatures also described above. For example use of a mixing temperature within the range of about 0° C. to about −100° C. for mixing the first and second catalyst components together to produce catalyst A (preferably in an aromatic solvent) and then using a treating temperature within the range of about 80° C. to about 180° C. for treating catalyst A with a halide ion exchanging source results in a catalyst which produces especially large and/or attrition resistant polymer particles.

The treating time can also be selected over a broad range and generally is within the range of about 10 minutes to about 10 hours. While the weight ratio of the halide ion exchanging source to catalyst A can be selected over a relatively broad range, the weight ratio of the halide ion exchanging source to catalyst A is generally within a range of about 10:1 to about 1:10 and more generally from about 7:1 to about 1:4. Following the treatment of catalyst A with the halide ion exchanging source the surplus halide ion exchanging source (the halide ion exchanging source which is not bound to catalyst B) is removed by washing catalyst B with a dry (essential absence of water) liquid such as a hydrocarbon of the type previously disclosed, n-hexane, or xylene for example. The resulting product, catalyst B, after drying, is stored under dry nitrogen.

It has been found that catalyst B can be stored for a month or longer without any significant decrease in activity.

If desired, catalyst A or catalyst B can be admixed with a particulate diluent such as, for example, silica, silica-alumina, silica-titania, magnesium dichloride, magnesium oxide, polyethylene, polypropylene, and poly(phenylene sulfide), prior to using the catalyst in a polymerization process. While the weight ratio of the particulate diluent to catalyst can be selected over a relatively wide range, the weight ratio of particulate diluent to catalyst generally is within the range of about 100:1 to about 1:100. More often, the weight ratio of particulate diluent to catalyst is within the range of about 20:1 to about 2:1 and use of a particulate diluent has been found effective to facilitate charging of the catalyst to the reactor.

The molar ratio of the organometallic compound of the cocatalyst to the transition metal compound of the first catalyst component is not particularly critical and can be selected over a relatively broad range. Generally, the molar ratio of the organometallic compound of the cocatalyst to the transition metal compound of the first catalyst component is within a range of about 1:1 to about 1500:1. However, it has been found that generally when relatively high amounts of the cocatalyst is employed in relation to the catalyst larger and/or more attrition resistant polymer particles are produced. For example, larger and/or more attrition resistant particles are produced when the weight ratio of cocatalyst to catalyst employed is at least about 4:1 up to about 400:1 and higher; however, weight ratios of cocatalyst to catalyst within the range of about 6:1 to about 100:1 are generally recommended as the best compromise between particle size and/or attrition resistance and polymer production since it has been found that generally the higher the cocatalyst level the lower the polymer production per unit weight of catalyst.

A variety of polymerizable compounds are suitable for use in the process of the present invention. Olefins which can be homopolymerized or copolymerized with the invention catalysts include aliphatic mono-1-olefins. While the invention would appear to be suitable for use with any aliphatic mono-1-olefin, those olefins having 2 to 18 carbon atoms are most often used. The mono-1-olefins can be polymerized according to the present invention employing either a particle form process or a solution form process. Aliphatic mono-1-olefins can be copolymerized with other 1-olefins and/or with other smaller amounts of other ethylenically unsaturated monomers, such as 1,3-butadiene, isoprene, 1,3-pentadiene, styrene, alpha-methylstyrene, and similar ethylenically unsaturated monomers which do not impair the catalyst.

The catalysts of this invention can also be utilized to prepare homopolymers and copolymers of conjugated diolefins. Generally the conjugated diolefins contain 4 to 8 carbon atoms per molecule. Examples of suitable conjugated diolefins include 1,3-butadiene, isoprene, 2-methyl-1,3-butadiene, 1,3-pentadiene, and 1,3-octadiene. Suitable comonomers, besides the conjugated diolefins listed above include mono-1-olefins previously described and vinylaromatic compounds generally. Some suitable vinylaromatic compounds are those having from about 8 to about 14 carbon atoms per molecule, and include for example styrene and various alkylstyrenes, such as 4-ethylstyrene and such as 1-vinylnaphthalene.

The weight percent of the conjugated diolefin in the copolymerization mixture can be selected over a relatively broad range. Generally the weight percent of the conjugated diolefin is from about 10 to about 95 weight percent and the other comonomers are from about 90 to about 5 weight percent. However, the weight percent of the conjugated diolefin is preferably from about 50 to about 90 weight percent and the other comonomers are from about 50 to about 10 weight percent.

In one aspect of the invention, the catalysts of the present invention have been found to be particularly effective for polymerization of mono-1-olefins such as ethylene as extremely high productivities have been obtained and thus mono-1-olefins such as ethylene are the preferred monomers for use with the catalysts of the present invention.

The polymerization process according to the present invention employing the catalysts and cocatalysts as above described can be performed either batchwise or continuously. In a batch process, for example, a stirred autoclave is prepared by first purging with nitrogen and then with a suitable compound, such as isobutane for example. When the catalyst and cocatalyst are employed either can be charged to the reactor first or they can be charged simultaneously through an entry port under an isobutane purge. After closing the entry port, hydrogen, if used, is added, and then a diluent such as isobutane is added to the reactor. The reactor is heated to the desired reaction temperature, which for polymerizing ethylene, for example, is, for best results, generally within a range of about 50° C. to about 120° C. and the ethylene is then admitted and maintained at a partial pressure within a range of about 5/10 MPa to about 5.0 MPa (70–725 psig) for best results. At the end of the designated reaction period, the polymerization reaction is terminated and the unreacted olefin and isobutane are vented. The reactor is opened and the polymer, such as polyethylene, is collected as a free-flowing white solid and is dried to obtain the product.

In a continuous process, for example, a suitable reactor such as a loop reactor is continuously charged with suitable quantities of solvent or diluent, catalyst, cocatalyst, polymerizable compounds and hydrogen if any and in any desirable order. The reactor product is continuously withdrawn and the polymer recovered as appropriate, generally by flashing the diluent (solvent) and unreacted monomers and drying the resulting polymer.

The olefin polymers made with the catalysts of this invention are useful in preparing articles by conventional polyolefin processing techniques such as injection molding, rotational molding, extrusion of film, and the like. For example, polyethylene made with the catalysts of this invention is typically of narrow molecular weight distribution which is especially desirable for injection molding applications. Furthermore, the polyethylene produced as described generally has a desirable high bulk density of about 0.44 g/cc as recovered from the polymerization zone. In addition, the polyethylene produced as described is characterized by a high degree of stiffness, e.g. high flexural modulus, which is also desirable in many applications.

EXAMPLE II

Catalyst Preparation

CATALYST A

All mixing and filtering operations were performed in a dry box (essential absence of air, i.e. oxygen, and water) under a dry nitrogen atmosphere employing dry n-heptane as the reaction medium. Anhydrous magnesium dichloride and titanium tetraethoxide (unless otherwise noted) were charged to a flask equipped for refluxing and stirring the contents of the flask. The mixture was brought to reflux temperature (about 100° C.), refluxed for the time shown in Table 2, cooled and filtered if extraneous or undissolved material was present. The product was cooled in an ice bath and the indicated organoaluminum halide compound was added to the product at a rate sufficient to avoid a significant temperature rise to produce a slurry. The resulting slurry was stirred about 30 minutes after removal of the flask from the ice bath. The slurry was filtered to produce a filter cake which was washed with portions of dry n-hexane and dried under a nitrogen purge to produce the product.

The quantities of the materials employed, weight and mole ratios of reactants charged and results obtained are given in Table 2.

TABLE 2

| | PREPARATION OF CATALYSTS (Catalyst A) | | | | | | | | | |
|---|---|---|---|---|---|---|---|---|---|---|
| Catalyst Designation | A-1 | A-2 | A-3 | A-4 | A-5 | A-6 | A-7 | A-8 | A-9 | A-10 |
| MgCl$_2$ | | | | | | | | | | |
| Grams | 0.950 | 9.518 | 0.955 | 2.856 | 2.856 | 0.952 | 0.952 | 9.516 | 0.952 | 0.952 |
| mole | 0.010 | 0.100 | 0.010 | 0.030 | 0.030 | 0.010 | 0.010 | 0.100 | 0.010 | 0.010 |
| Ti(OR)$_4$[(1)] | | | | | | | | | | |
| grams | 4.460 | 45.59 | 4.554 | 13.673 | 13.673 | 4.540 | 4.540 | 45.60 | 3.403 | 4.54 |

TABLE 2-continued

PREPARATION OF CATALYSTS (Catalyst A)

| Catalyst Designation | A-1 | A-2 | A-3 | A-4 | A-5 | A-6 | A-7 | A-8 | A-9 | A-10 |
|---|---|---|---|---|---|---|---|---|---|---|
| mole | 0.0196 | 0.200 | 0.020 | 0.060 | 0.060 | 0.020 | 0.020 | 0.200 | 0.010 | 0.02 |
| 2nd Catalyst Component | | | | | | | | | | |
| Type | EASC[2] | EASC[2] | EADC[3] | EADC[3] | DEAC[4] | DEAC[4] | i-BADC[5] | EASC[2] | EASC[2] | EASC[2] |
| ml | 17.5 | 250 | 13.5 | 27 | 52 | 26.5 | 16.7 | 250 | 12.5 | 12.0 |
| mole | 0.0140 | 0.200 | 0.020 | 0.040 | 0.0393 | 0.020 | 0.020 | 0.200 | 0.010 | 0.01 |
| Reaction Diluent[7] | | | | | | | | | | |
| ml | 30 | 550 | 60 | 150 | 150 | 60 | 60 | 530 | 60 | 50 |
| Reflux, Min. | 20 | 45 | 60 | 60 | 60 | 60 | 60 | 60 | 80 | 45 |
| Wash Liquid[6] | | | | | | | | | | |
| ml | 50 | 600 | 40 | 50 | 50 | 60 | 50 | 250 | 30 | 30 |
| Mole Ratios | | | | | | | | | | |
| Ti/Mg | 1.96:1 | 2:1 | 2:1 | 2:1 | 2:1 | 2:1 | 2:1 | 2:1 | 1:1 | 2:1 |
| Ti/2nd catalyst comp. | 1.4:1 | 1:1 | 1:1 | 1.5:1 | 1.53:1 | 1:1 | 1:1 | 1:1 | 1:1 | 2:1 |
| Recovered Product | | | | | | | | | | |
| grams | 2.948 | 25.54 | 2.925 | 3.136 | 2.868 | 2.615 | 2.828 | 29.440 | 1.350 | 3.250 |
| Color | off-white | brown | white | pink-brown | lt. brown | cream | white | lt. brown | lt. brown | lt. yellow |

Notes:
[1]Ti(OR)$_4$ in catalysts A-1 through A-8 and A-10 was Ti(OC$_2$H$_5$)$_4$. In catalyst A-9, it was Ti(O n-C$_4$H$_9$)$_4$.
[2]EASC is ethylaluminum sesquichloride, 25 wt. % in n-heptane.
[3]EADC is ethylaluminum dichloride, 25 wt. % in n-hexane.
[4]DEAC is diethylaluminum chloride, 12.96 wt. % in n-hexane.
[5]i-BADC is isobutylaluminum dichloride, 25.4 wt. % in n-hexane.
[6]n-Hexane.
[7]n-Heptane.

EXAMPLE III

Catalyst Preparations

Catalyst B

All mixing and filtering operations were conducted in a dry box under a nitrogen atmosphere employing dry n-hexane as the reaction medium. To a flask equipped for stirring was charged the n-hexane, catalyst A and titanium tetrachloride. Generally, each mixture was stirred about 1 hour at ambient temperature, e.g., about 25° C., and then filtered. The filter cake was washed with portions of dry n-hexane and dried under a nitrogen purge. The dry powdery product was sieved through a 50 mesh screen to remove the larger particles.

The quantities of components employed, weight ratios of catalyst A to TiCl$_4$ and results obtained are given in Table 3.

| Element | Catalyst A-2 | Catalyst B-2 |
|---|---|---|
| Carbon | 17.5 | 10.1 |
| Hydrogen | 5.0 | 2.6 |
| Chlorine | 39.4 | 54.7 |
| Oxygen[10] | 16.2 | 10.9 |
| Titanium | 11.9 | 13.0 |
| Magnesium | 7.6 | 7.2 |
| Aluminum | 2.4 | 1.5 |

[10]The amount of oxygen was determined by subtracting total weight of other components from the total weight of the catalyst sample.

The results indicate that treating catalyst A compositions with TiCl$_4$ has some effect on the amount of the elements making up the compositions. The Ti concentration increased 1.1 wt. % and chlorine concentration increased 15.3 wt. % at the expense of carbon, hydrogen and oxygen in particular.

TABLE 3

PREPARATION OF CATALYSTS (Catalyst B)

| Catalyst Designation | Catalyst A No. | Catalyst A grams | TiCl$_4$ grams | Weight Ratio TiCl$_4$/Catalyst A | Hydrocarbon Used ml. Reaction Diluent | Hydrocarbon Used ml. Wash | Reaction Time Min. | Recovered Product grams | Recovered Product Color |
|---|---|---|---|---|---|---|---|---|---|
| B-1 | A-1 | 1.014 | 4.992 | 4.9:1 | 20 | 20 | 60 | 0.796 | grayish |
| B-2[8] | A-2 | 25.140 | 129.450 | 5.1:1 | 460 | 500 | 75 | 25.540 | brown |
| B-3 | A-3 | 1.000 | 5.000 | 5:1 | 20 | 30 | 60 | 0.771 | grayish |
| B-4 | A-4 | 0.984 | 5.000 | 5.1:1 | 20 | 30 | 25 | 0.790 | grayish |
| B-5 | A-5 | 1.000 | 5.000 | 5:1 | 20 | 30 | 60 | 1.025 | lt. brown |
| B-6 | A-6 | 1.000 | 5.000 | 5:1 | 20 | 30 | 60 | 0.870 | grayish |
| B-7 | A-7 | 1.000 | 5.000 | 5:1 | 20 | 30 | 60 | 0.695 | white |
| B-8[9] | A-8 | 25.440 | 146.710 | 5.8:1 | 550 | 300 | 60 | 27.498 | brown |
| B-9 | A-9 | 1.210 | 6.000 | 5:1 | 20 | 20 | 60 | 1.095 | lt. brown |
| B-10 | A-10 | 2.000 | 10.000 | 5:1 | 40 | 45 | 60 | 1.639 | yellow-brown |

Notes:
[8]21.040 grams of recovered product were diluted with 84.054 grams of 50 mesh polyethylene fines dried in a vacuum oven and the mixture was roll milled overnight (approx. 13 hours). Mixed catalyst consists of about 1 part by weight active component and 4 parts by weight diluent. The mixture was kept under N$_2$.
[9]27.498 grams of recovered product were diluted with 108.502 grams of dry polyethylene fines and processed as described in footnote (8). The mixture was kept under N$_2$. Mixed catalyst consists of about 1 part by weight active component and 3.95 parts by weight diluent.

Elemental analyses of catalysts A-2 and B-2 (not mixed with polyethylene fines) were performed and the results obtained are shown below in terms of wt. % of each element:

From the above results it is believed that the halide ion exchanging source, which in this instance was titanium tetrachloride, caused an exchange of chloride for ethoxide groups in the catalyst.

Catalysts A-2 and B-2 were also examined by powder X-ray diffraction and X-ray photoelectron spectroscopy to measure the surface composition and bulk crystalline phases.

The results indicated no significant differences in the elemental composition of the surface within experimental error. However, Catalyst B-2 appeared to be amorphous whereas catalyst A-2 appeared to have a highly crystalline component present with a low surface area.

EXAMPLE IV

Ethylene Polymerization

A 3.8 liter, stirred, stainless steel reactor was employed for ethylene polymerization. The reactor was conditioned for for each run by charging to it 3 liters of dry n-heptane, closing the port, and heating the reactor and contents at 175° C. for 30 minutes. The reactor was drained and residual heptane purged with dry nitrogen. The reactor was then closed and cooled under nitrogen pressure.

The conditioned reactor was purged with dry isobutane vapor and 3 ml of the cocatalyst solution containing 15 wt. % triethylaluminum (TEA) in dry n-heptane (2.8 mmoles TEA) was charged followed by addition of the catalyst. The reactor was closed, about 2.1 liters of dry isobutane was charged, the reactor and contents were heated to 80° C. and the ethylene and hydrogen, if used, was added.

Each run was terminated by flashing the ethylene and isobutane and hydrogen, if present, from the reactor. The polymer was then recovered, dried and weighed to obtain the yield.

Each polymer yield was divided by the weight of catalyst employed to determine the calculated catalyst productivity which is expressed as kilograms (kg) polyethylene per gram (g) catalyst per hour. In some runs of less than 60 minutes duration, a productivity figure is calculated for 60 minutes in which the reasonable assumption is made based on past experience that the activity of the catalyst remains unchanged during at least the first 60 minutes of each run. When the catalyst is diluted, a calculated productivity based on kg polyethylene produced per gram diluted catalyst per hour is given as well as kg polyethylene produced per gram catalyst contained in the mixture per hour.

The quantity of each catalyst employed, run time, pressures employed, and results obtained are presented in Table 4.

TABLE 4

ETHYLENE POLYMERIZATION AT 80° C.
2.8 MMoles TEA (3 ml) as Cocatalyst in Each Run

| Run No. | Catalyst Designation | grams | Run. Time min. | Polyethylene Yield grams | Catalyst Productivity kg polymer/g catalyst/hour | Avg. MPa | Total psig | Ethylene MPa | psig | Hydrogen MPa | psig |
|---|---|---|---|---|---|---|---|---|---|---|---|
| 1 | A-1 | 0.0146 | 60 | 479 | 32.8 | 1.79 | 260 | 0.69 | 100 | 0 | 0 |
| 2 | A-2 | 0.0093 | 60 | 330 | 35.5 | 1.93 | 280 | 0.69 | 100 | 0 | 0 |
| 3 | A-3 | 0.0199 | 60 | 270 | 13.6 | 1.93 | 280 | 0.69 | 100 | 0 | 0 |
| 4 | A-4 | 0.0210 | 60 | 690 | 32.9 | 1.93 | 280 | 0.69 | 100 | 0 | 0 |
| 5 | A-5 | 0.0198 | 60 | 504 | 25.5 | 1.93 | 280 | 0.69 | 100 | 0 | 0 |
| 6 | A-6 | 0.0218 | 60 | 68 | 3.1 | 1.93 | 280 | 0.69 | 100 | 0 | 0 |
| 7 | A-7 | 0.0134 | 60 | 119 | 8.9 | 2.00 | 290 | 0.69 | 100 | 0 | 0 |
| 8 | A-8 | 0.0167 | 60 | 480 | 28.7 | 1.93 | 280 | 0.69 | 100 | 0 | 0 |
| 9 | A-9 | 0.0113 | 60 | 233 | 20.6 | 1.93 | 280 | 0.69 | 100 | 0 | 0 |
| 10 | A-10 | 0.0054 | 60 | 112 | 20.7 | 1.93 | 280 | 0.69 | 100 | 0 | 0 |
| 11 | B-1 | 0.0039 | 60 | 577 | 148 | 1.79 | 260 | 0.69 | 100 | 0 | 0 |
| 12 | B-2[11] | 0.0121 | 60 | 355 | 147 (29.33 kg/g cat) | 2.00 | 290 | 0.69 | 100 | 0 | 0 |
| 13 | B-3[12] | 0.0116 | 30 | 631 | 109 (54.4 kg/30 min) | 1.97 | 285 | 0.69 | 100 | 0 | 0 |
| 14 | B-3[13] | 0.0085 | 30 | 510 | 120 (60.0 kg/30 min) | 1.93 | 280 | 0.69 | 100 | 0 | 0 |
| 15 | B-4[14] | 0.0051 | 40 | 424 | 125 (83.1 kg/40 min) | 1.97 | 285 | 0.69 | 100 | 0 | 0 |
| 16 | B-5 | 0.0053 | 60 | 387 | 73.0 | 1.97 | 285 | 0.69 | 100 | 0 | 0 |
| 17 | B-6[15] | 0.0118 | 45 | 787 | 88.9 (66.7 kg/45 min) | 2.00 | 290 | 0.69 | 100 | 0 | 0 |
| 18 | B-7 | 0.0144 | 60 | 538 | 37.4 | 2.41 | 350 | 1.0 | 150 | 0.41 | 60 |
| 19 | B-8[16] | 0.0220 | 60 | 162 | 36.4 (7.34 kg/g cat) | 2.41 | 350 | 1.0 | 150 | 0.41 | 60 |
| 20 | B-9[17] | 0.0123 | 40 | 688 | 83.8 (55.9 kg/40 min) | 1.93 | 280 | 0.69 | 100 | 0 | 0 |
| 21 | B-10 | 0.0029 | 60 | 610 | 210 | 1.97 | 285 | 0.69 | 100 | 0 | 0 |

Notes:
[11]One part by weight catalyst diluted with 4 parts by weight polyethylene powder; calculated productivity is 5 × 29.3 or 147 kg polymer/g undiluted catalyst.
[12]30 minute run time, calculated productivity is 54.4 × 60 + 30 kg/g cat or 109 kg/g cat/hour.
[13]30 minute run time, calculated productivity is 60 × 60 + 30 kg/g cat or 120 kg/g cat/hour.
[14]40 minute run time, calculated productivity is 83.1 × 60 + 40 kg/g cat or 125 kg/g cat/hour.
[15]45 minute run time, calculated productivity is 66.7 × 60 + 45 kg/g cat or 88.9 kg/g cat/hour.
[16]One weight part catalyst diluted with 3.95 parts by weight polyethylene powder; calculated productivity is 4.95 × 7.36 or 36.4 kg polymer/g undiluted catalyst.
[17]40 minute run time, calculated productivity is 55.9 × 60 + 40 kg/g cat or 83.8 kg/g cat/hour.

The results given in Table 4 indicate that the A catalysts, while relatively active for ethylene polymerization, are not nearly as active as the B catalysts which are formed from the corresponding A catalysts by a TiCl$_4$ treatment. In terms of kg polyethylene produced per g (undiluted) catalyst per hour, the indicated A catalysts generally produce from about 3 to 36 kg polymer whereas their B counterparts generally produce from about 36 to 210 kg polymer. It is also noted in this regard that catalysts B-6 and B-7 (runs 18 and 19) showed exceptionally high productivities as compared to their corresponding "A" catalysts, catalysts A-6 and A-7 (runs 6 and 7).

The best results under the conditions employed, were obtained in run 21 employing catalyst B-10 produced from catalyst A-10 composition prepared from a titanium ethoxide-magnesium dichloride reaction product treated with ethylaluminum sesquichloride. This catalyst was extremely active and produced 210 kg polyethylene per gram of catalyst per hour.

EXAMPLE V

Catalyst Preparation

The quantities of materials employed, weight and mole ratios of reactants charged and results obtained are presented in Table 5.

TABLE 5

| | Preparation of Catalysts (Catalyst A) | | | | | | |
|---|---|---|---|---|---|---|---|
| Catalyst Designation | A-11 | A-12 | A-13 | A-14 | A-15 | A-16[a] | A-17 |
| $MgCl_2$ | | | | | | | |
| grams | 1.90 | 1.90 | 9.52 | 1.92 | 1.92 | 946 | 11.4 |
| mole | 0.020 | 0.020 | 0.100 | 0.020 | 0.020 | 9.94 | 0.120 |
| $Ti(OC_2H_5)_4$ | | | | | | | |
| grams | 9.12 | 9.11 | 45.40 | 9.39 | 9.10 | 4309 | 55.5 |
| mole | 0.040 | 0.040 | 0.200 | 0.041 | 0.040 | 18.9 | 0.244 |
| Reaction Medium | | | | | | | |
| type | n-hexane | xylenes | xylenes | n-hexane | n-hexane | n-hexane | xylenes |
| ml | 100 | 70 | 250 | 75 | 110 | 60.6 liters | 100 |
| temperature, °C. | 108 | 107 | 110 | 110 | 105 | 84 | 110 |
| heating time, minutes | 30 | 30 | 30 | 30 | 40 | 45 | 60 |
| Ethylaluminum Sesquichloride | | | | | | | |
| ml | 25 | 25 | 125 | 42 | 42 | 12.5 l | 301[b] |
| mole | 0.020 | 0.020 | 0.098 | 0.033 | 0.033 | 12.7 | 0.24 |
| reaction temperature, °C. | 25 | −18 | −20 to −25 | −25 | −27 | 21 to 30 | −23 to −25 |
| reaction time, minutes | 90 | 80 | 270 | 135 | 280 | 120 | 240 |
| Wash liquid | | | | | | | |
| ml | 30 | 30 | 150 | 120 | 120 | 4,57 liter[d] | 300[c] |
| Mole Ratios | | | | | | | |
| Ti/Mg | 2:1 | 2:1 | 2:1 | 2:1 | 2:1 | 1.9:1 | 2:1 |
| Ti/EASC | 2:1 | 2:1 | 2:1 | 1.2:1 | 1.2:1 | 1.5:1 | 1:1 |
| Recovered Product | | | | | | | |
| grams | 5.21 | 4.51 | 20.95 | 6.33 | 6.25 | not recovered | 39.53 |
| color | white | tan | white | tan | tan | not determined | light purple |

[a]Several batches of catalysts were made under the conditions shown which were combined and are identified as A-16.
[b]Add to 200 ml of xylenes cooled to −26° C. and resting in a $CCl_4$/dry ice bath, the solution of $MgCl_2/Ti(OC_2H_5)$ cooled to 25° C. followed by the solution of EASC in a dropwise manner.
[c]Washed filter cake with 50 ml xylenes, then 250 ml of n-hexane.
[d]Used 4, 57 liter portions, decanting liquid off product after each addition.

Catalyst A

All mixing and filtering operations were performed in a dry box under an argon atmosphere employing a dry hydrocarbon as the reaction medium. Anhydrous magnesium dichloride and titanium tetraethoxide were charged to a flask equipped for refluxing and stirring and containing the chosen reaction medium. Each mixture was heated at the temperature and for the time indicated in Table 5 and cooled to the temperature indicated for the dropwise addition of the 0.783 molar solution of ethylaluminum sesquichloride in n-heptane. The resulting slurry was generally stirred an additional 30 minutes after the reaction was completed, stirring was discontinued and the mixture allowed to warm to room temperature, if cooling had been employed. The slurry was suction filtered to produce a filter cake which was washed with portions of dry n-hexane and dried under an argon purge to produce the product.

EXAMPLE VI

Catalyst Preparation

Catalyst B

All mixing and filtering operations were conducted in a dry box under an argon atmosphere employing dry n-hexane as the reaction medium. To a flask equipped for stirring and reflux was charged n-hexane, the catalyst A of Example 5 and titanium tetrachloride. Each mixture was stirred at the temperature and for the time indicated in Table 6, cooled to room temperature, if needed, and then suction filtered. The filter cake was washed with portions of dry n-hexane and dried under an argon purge.

The quantities of components employed, weight ratios of catalyst A to $TiCl_4$ and results obtained are given in Table 6.

TABLE 6

| | | | | Preparation of Catalyst (Catalyst B) | | | | | | |
|---|---|---|---|---|---|---|---|---|---|---|
| | | | | Weight Ratio | Reaction Condition | | n-Hexane, ml | | | |
| Catalyst | Catalyst A | | $TiCl_4$ | $TiCl_4$/ | Time | Max. | Reaction | | Recovered Product | |
| Designation | No. | Grams | Grams | Catalyst A | Min. | Temp. °C. | Medium | Wash | Grams | Color |
| B-11 | A-11 | 2.22 | 8.9 | 4:1 | 60 | 112 | 11 | 30(a) | 1.70 | lt. purple |
| B-12 | A-12 | 2.05 | 8.0 | 3.9:1 | 60 | 116 | 10 | 30(a) | 1.83 | lt. purple |
| B-13-0 | A-13 | 3.00 | 12.0 | 4:1 | 60 | 182 | 15 | 50 | 3.58 | yellow |
| B-13-1 | A-13 | 3.00 | 12.0 | 4:1 | 80 | 80 | 15 | 30 | 2.55 | white |
| B-13-2 | A-13 | 3.00 | 12.0 | 4:1 | 75 | 132 | 15 | 30 | 2.71 | lt. yellow |
| B-13-3 | A-13 | 2.00 | 7.7 | 3.85:1 | 60 | 25 | 10 | 30(a) | 1.61 | white |
| B-14 | A-14 | 2.19 | 7.7 | 3.5:1 | 60 | 122 | 15 | 30 | 2.10 | brown |
| B-15 | A-15 | 2.03 | 7.7 | 3.8:1 | 60 | 105 | 10 | 30(a) | 1.99 | lt. purple |
| B-16 | A-16 | 5255(a) | 9072 | 1.7:1 | 60 | 25 | 18.9 l. | 4, 57 l. portions | 2470(a) | brown |
| B-17 | A-17 | 39.53 | 154.0 | 3.9:1 | 55 | 110 | 200 | 200 | 33.36 | lt. purple |
| B-18 | A-11 | 0.79 | 3.4 | 4.3:1 | 60 | 25 | 5 | 30(a) | 0.69 | grayish |

Note:
(a)Estimated

EXAMPLE VII

Ethylene Polymerization

A 3.8 liter, stirred, stainless steel reactor as described and conditioned in Example IV was employed for ethylene polymerization.

The conditioned reactor for each run was purged with dry isobutane vapor and 1 ml of the cocatalyst solution containing 15 wt. % triethylaluminum (TEA) in dry n-heptane (0.93 mmoles TEA) was charged followed by addition of the catalyst. The reactor was closed, about 2 liters of dry isobutane was charged, the reactor and contents were heated to 80° C. and the ethylene was added. Hydrogen was not present in any of the runs, thus each of the polymers produced had a melt index of less than 0.5. Unless indicated to the contrary in Table 7, a run time of 60 minutes was observed in each run.

Each run was terminated and the polymer recovered as described in Example IV. If a run time of less than 60 minutes was employed, a calculated productivity figure for 60 minutes is employed as described in Example 4.

The particle size distribution of the recovered polymer as made and/or ground in a Waring Blendor was determined by placing about 100 grams of the polymer on a set of mechanically agitated sieves. The sieve set consisted of sieves having the mesh sizes (U.S. Sieve Series) of 30, 50, 80, 100, 200 and the bottom pan. Agitation was conducted for 30 minutes unless indicated otherwise and the amount of polymer remaining on each sieve and in the pan was determined by weighing. The ground samples were agitated for 2 minutes at high speed at room temperature in a Waring Blendor. The purpose of grinding the as made polymer is to simulate the attrition polymer particles appear to receive in a large scale reactor such as a loop reactor, for example, since commercially formed polymer particles are generally subjected to substantial agitation which results in the production of finer particles as compared to those made on the bench scale.

Grinding the polymer in a Waring Blendor as referred to above and throughout this application is carried out by grinding 100 grams of the polymer fluff in a dry condition at room temperature (25° C.) for 2 minutes using the highest speed on a Waring Blendor Model 31DL42 manufactured by Waring Products Division, Dynamics Corporation of America, New Hartford, Conn. Although most any grinder or blender suitable for vigorously agitating relatively small quantities of polymer can be used, the Waring Blendor described above worked very well.

The ground fluff is then screened for 15 minutes. An electric Ro-Tap Sieve Shaker manufactured by the U.S. Tyler Manufacturing Company, Cleveland, Ohio, was used; however, most any sieve shaker could be used or the polymer could be sieved by hand.

The quantity of each catalyst employed and results obtained are given in Table 7.

In each run the initial ethylene pressure was 0.69 MPa (98.5 psig), and the average total pressure was 1.9 MPa (271.4 psig) for all runs except runs 24 and 26 in which it was 2.0 MPa (285.7 psig).

TABLE 7

Effect of Catalyst Formation Conditions on Polymer Particle Size and Productivity

| Run No. | Catalyst Formation Reaction Medium | EASC °C. | TiCl₄ °C. | Catalyst Weight Grams | Catalyst No. | Calculated Productivity Kg/g/hr(a) | Polymer Yield Grams | Wt. % Coarser Than 100 Mesh As Made | Wt. % Coarser Than 100 Mesh Ground |
|---|---|---|---|---|---|---|---|---|---|
| 22 | n-hexane | 25 | 112 | 0.0023 | B-11 | 193.5 | 445 | 82 | 59 |
| 23 | n-hexane | −25 | 122 | 0.0050 | B-14 | 107.8 | 539 | 81(d) | 54(d) |
| 24 | n-hexane | −25 | 105 | 0.0034 | B-15 | 248.5(b) | 507 | —(e) | 46(d) |
| 25 | xylenes(f) | −24 | 25 | 0.0036 | B-13-3 | 161.7 | 582 | 95 | 82 |
| 26 | xylenes | −24 | 80 | 0.0068 | B-13-1 | 97.5 | 663 | 93 | — |
| 27 | xylenes | −18 | 116 | 0.0053 | B-12 | 162.1(c) | 573 | 91 | 85 |
| 28 | xylenes | −24 | 132 | 0.0067 | B-13-2 | 82.7 | 554 | 96 | 89 |
| 29 | xylenes | −25 | 180 | 0.0099 | B-13-0 | 19.8 | 196 | 99.8 | 95 |
| 30 | n-hexane | 25 | 25 | 0.0045 | B-18 | 144 | 647 | —(e) | 34 |

(a)kg polymer per g catalyst per hour.
(b)Run time of 36 minutes giving 507 g polymer. Productivity for 60 minutes is calculated to be 149.1 kg/g/36 min. × 60 min. ÷ 36 min. or 248.5 kg/g/60 min.
(c)Run time of 40 minutes giving 573 g polymer. Productivity for 60 minutes is calculated to be 108.1 kg/g/40 min. × 60 min. ÷ 40 min. or 162.1 kg/g/60 min.
(d)Sieve agitation for 15 minutes was employed.
(e)A dash signifies no determination was made.
(f)Analytical reagent quality, 137°–144° C. boiling point range.

Inspection of the results presented in Table 7 shows that the reaction conditions employed in forming the catalyst are of importance from a productivity standpoint of polymer produced per unit catalyst weight per hour as well as from a particle size distribution of the polymer. The most productive catalysts appear to result as shown in runs 22–24 when catalyst A is formed in a paraffin reaction medium at temperatures ranging from about −25° to about 25° C. and the final catalyst (catalyst B) is formed by contact of catalyst A with TiCl₄ at temperatures ranging from about 100° to about 125° C. These catalysts form relatively coarse polymer as made consisting approximately of 80 wt. % coarser than 100 mesh. The polymer is somewhat friable in nature, however, since after grinding it in a Waring Blendor for 2 minutes the amount of coarse polymer remaining consists of about 45 to 60 wt. % coarser than 100 mesh.

When catalyst A is made in an aromatic reaction medium at about −20° to −25° C. and catalyst B is formed by contact of catalyst A with TiCl₄ at temperatures ranging from about 80° to 180° C. the particle size of as made polymer and ground polymer is coarser in nature as the results of runs 25–29 demonstrate. The coarsest, most attrition resistant polymer was made with catalyst B formed by contact with TiCl₄ at 180° C. However, the productivity of this catalyst was substantially lower as compared to the other catalysts of runs 25–29. The data in runs 25–29 indicate that when catalyst A is formed at about −25° C. and catalyst B is formed from catalyst A at about 80° to about 130° C. said catalyst B is capable of producing coarse, attrition resistant polymer at high rates in a slurry polymerization process.

All of the polymers shown in Table 7 have relatively low melt index values, i.e., less than about 0.5, as determined in accordance with the procedure of ASTM D1238-65T, condition E.

EXAMPLE VIII

Ethylene Polymerization-Effect of Cocatalyst Level

A 3.8 liter, stirred, stainless steel reactor as described and conditioned in Example IV was employed for ethylene polymerization.

The conditioned reactor for each run was purged with dry isobutane, the indicated quantity of cocatalyst solution containing 15 wt. % triethylaluminum (TEA) in dry n-heptane (1 molar) was charged followed by addition of the catalyst. A portion of catalyst B-16 was used in each run. The reactor was closed, about 2 liters of dry isobutane was charged, the reactor and contents were heated to 100° C. and the ethylene and hydrogen were charged. Run times of 60 minutes were employed.

Each run was terminated and the polymer recovered as described in Example IV. The particle size distribution of the as made and/or ground polymer was determined as described in Example 7.

The quantity of each catalyst and cocatalyst employed, the melt index of each polymer and the results obtained are given in Table 8.

In each run, the initial hydrogen pressure was 0.34 MPa (50 psig), the initial ethylene pressure was 1.4 MPa (200 psig) and the total pressure attained during polymerization was 3.4 MPa (500 psig) except for run 35 which it was 3.3 MPa (485 psig).

cocatalyst level increases. Since aluminum alkyl cocatalysts are relatively expensive materials it is desirable to use the least amount of cocatalyst consistent with high polymer production and low cocatalyst residues as well as the production of attrition resistant polymer. The results indicate that the objective is reached with the materials and conditions employed when the cocatalyst level ranges between about 20 to 200 ppm TEA (wt. ratio of cocatalyst to catalyst of about 4:1 to about 40:1), more preferably between about 30 to 100 ppm (wt. ratio of cocatalyst to catalyst of about 6:1 to about 35:1).

Melt index determinations of the produced polymer clearly show that commercially useful material was produced since many applications exist for polymers in the 0.4 to 4 melt index range including film, sheet, pipe, bottles, containers, and the like. The HLMI/MI ratios shown are indicative of relatively narrow molecular weight distribution polymer. Ethylene polymers with such molecular weight distribution are especially suitable for injection molding.

EXAMPLE IX

A. Catalyst Preparation (Catalyst A)

B. Catalyst Preparation (Catalyst B)

C. Ethylene Polymerization in Presence of Hydrogen

A. A series of Catalyst A was prepared generally in the manner indicated previously as in Example V. The quantities of reactants employed, reaction conditions used, and results obtained are given in Table 9. B. Catalyst B was prepared generally in the manner described in Example VI by contacting a weighed portion of the Catalyst A series with $TiCl_4$. The quantities of reactants employed, reaction conditions utilized, and results obtained are shown in Table 9B. A series of ethylene poly-

TABLE 8

| | | | | | | Effect of Cocatalyst Concentration on Polymer Particle Size | | | | | |
|---|---|---|---|---|---|---|---|---|---|---|---|
| | | | | | Wt. ratio | Calculated | Polymer Weight Percent Coarser | | | | |
| Run No. | Catalyst Wt. g | mmoles | g | ppm(a) | Cocat./ Catalyst | Productivity kg/g/hr | Yield g | MI(b) | HLMI(c) MI | Than 100 Mesh | |
| | | | | | | | | | | As Made | Ground |
| 31 | 0.0059 | 0.2 | 0.023 | 21 | 3.9 | 51.4 | 303 | 1.1 | 29 | —(e) | 66 |
| 32 | 0.0051 | 0.25 | 0.029 | 26 | 5.7 | 24.7 | 126 | 0.4 | 31 | 99 | 45 |
| 33 | 0.0052 | 0.3 | 0.035 | 31 | 6.7 | 63.5 | 330 | 0.6 | 31 | — | 87 |
| 34 | 0.0057 | 0.5 | 0.058 | 52 | 10 | 44.6 | 254 | 1.7 | 25 | — | 66 |
| 35 | 0.0099 | 0.5 | 0.058 | 52 | 5.9 | 39.7 | 393 | 1.6 | 27 | 99 | 88 |
| 36 | 0.0068 | 1.0 | 0.115 | 104 | 17 | 38.6 | 249 | 4.0 | 28 | 99 | 73 |
| 37 | 0.0071 | 2.0 | 0.230 | 208 | 32 | 38.7 | 275 | 2.1 | 29 | — | 84 |
| 38 | 0.0072 | 5.0 | 0.576 | 520 | 80 | 34.2 | 246 | 1.3 | 28 | 99 | 95 |

(a)Parts per million based on the weight of 2 liters of isobutane (1100 g).
(b)MI is melt index, g/10 minutes, ASTM D1238-65T, condition E.
(c)HLMI is high load melt index, g/10 minutes, ASTM D1238-65T, condition F. The ratio, HLMI/MI, is believed to relate to molecular weight distribution. The higher the value, the broader the distribution.
(d)The levels of TEA cocatalyst employed in the runs can be related to an approximate mole ratio of TEA to Ti in the above catalysts ranging from about 10:1 to about 450:1.
(e)A dash signifies no determination was made.

The data given in Table 8 show that the coarse polymer as made is produced at all of the cocatalyst levels employed. The trends observed in runs 31-38 indicates that more attrition resistant polymer is formed as the cocatalyst level increases based on the ground polymer results. At the same time, however, the productivity of the catalyst appears to diminish somewhat as the merization runs were carried out generally as described in Example VII using each catalyst B shown in Table 9B; however each polymerization run was carried out in the presence of hydrogen in order to produce a higher melt index polymer. The polymers produced and the conditions employed are shown in Table 9C.

TABLE 9A

| | Preparation of Catalysts (Catalyst A) | | | |
|---|---|---|---|---|
| Catalyst Designation | A-19 | A-20 | A-21 | A-22 |
| $MgCl_2$ | | | | |
| grams | 1.90 | 9.52 | 11.40 | 5.80 |
| mole | 0.020 | 0.100 | 0.120 | 0.061 |
| $Ti(OC_2H_5)_4$ | | | | |

TABLE 9A-continued

| | Preparation of Catalysts (Catalyst A) | | | |
|---|---|---|---|---|
| Catalyst Designation | A-19 | A-20 | A-21 | A-22 |
| grams | 9.10 | 45.40 | 56.19 | 28.23 |
| mole | 0.040 | 0.200 | 0.246 | 0.124 |
| Reaction Medium | | | | |
| type | n-hexane | xylenes | xylenes | xylenes |
| ml | 100 | 250 | 300 | 150 |
| temp., °C. | 97 | 110 | 120 | 120 |
| heating time, min. | 30 | 30 | 40 | 35 |
| Ethylaluminum Sesquichloride | | | | |
| ml | 25 | 125 | 220 | 77.5 |
| mole | 0.020 | 0.098 | 0.170 | 0.060 |
| reaction temp., °C. | +25 | −20 to −25 | −25 to −35 | −21 to −27 |
| reaction time, min. | 95 | 270 | 8.6 hours | 205 |
| Wash liquid | n-hexane | n-hexane | n-hexane | n-hexane |
| ml | 100 | 100 | 400 | 1000 (4 250 ml portions) |
| Mole Ratios | | | | |
| Ti/Mg | 2:1 | 2:1 | 2:1 | 2:1 |
| Ti/EASC | 2:1 | 2:1 | 1.4:1 | 2:1 |
| Recovered Product | | | | |
| grams | 2.10 | 2.55 | not determined | not determined |
| color | brown | white | brown | brown |

TABLE 9B

Preparation of Catalysts (Catalyst B)

| Catalyst Desig. | Catalyst A No. | Catalyst A Grams | $TiCl_4$ Grams | Wt. Ratio $TiCl_4$/Cat. A | Reaction Conditions Time Min. | Reaction Conditions Max. Temp. °C. | n-Hexane, ml Reaction Medium | n-Hexane, ml Wash Medium | Recovered Product Grams | Recovered Product Color |
|---|---|---|---|---|---|---|---|---|---|---|
| B-19 | A-19 | 5.05 | 10.4 | 2.1:1 | 60 | 25 | 25 | 30 | 4.71 | brown |
| B-20 | A-20 | 3.00 | 12. | 4:1 | 60 | 80 | 15 | " | 2.55 | white |
| B-21 | A-21 | 31.9(a) | 128 | 4:1 est. | 60 | 122 | 150 | 400 est. | 32.55 | lt. purple |
| B-22 | A-12 | 2.11 | 7.9 | 3.7:1 | 60 | 25 | 10 | 45 | 1.90 | gray |

(a)Estimated yield based on previous experiments.

TABLE 9C

Ethylene Polymerization, Hydrogen Present, 1 Mmole TEA
Effect of catalyst Formation on Productivity and Polymer Particle Size

| Run No. | Catalyst Formation Reaction Medium | Catalyst Formation EASC °C. | Catalyst Formation $TiCl_4$ °C. | Catalyst No. | Catalyst Weight Grams | Pressures, MPa(c) Ethylene | Pressures, MPa(c) Hydrogen | Pressures, MPa(c) Total Reactor | Calculated Productivity kg/g/hr | Yield Grams | Melt Index | Polymer Wt. % Coarser Than 100 Mesh (Ground) |
|---|---|---|---|---|---|---|---|---|---|---|---|---|
| 39 | n-hexane | 25 | 25 | B-19 | 0.0212 | 1.48 | 0.446 | 3.41 | 21.7 | 461 | 3.6 | 57 |
| 40 | " | " | " | " | 0.0183 | " | 0.892 | 3.62 | 8.42(a) | 154(a) | 4.7 | 33 |
| 41 | " | " | " | " | 0.0195 | " | " | " | 26.6(b) | 518(b) | 13 | 58 |
| 42 | " | " | " | " | 0.0156 | " | " | 3.55 | 12.4 | 194 | 19 | 48 |
| 43 | xylenes | −18 | 25 | B-22 | 0.0061 | " | " | " | 48.5 | 296 | 12 | 57 |
| 44 | " | −25 to −35 | 122 | B-21 | 0.0077 | " | 0.446 | 3.62 | 45.7 | 352 | 0.17 | 92.5 |
| 45 | " | " | " | " | 0.0117 | " | 0.892 | 3.76 | 36.4 | 426 | 3.2 | 67 |
| 46 | " | " | " | " | 0.0133 | 1.20 | 1.14 | 3.69 | 34.7 | 461 | 11 | 63 |
| 47 | " | −20 to −25 | 80 | B-20 | 0.0119 | 1.48 | 0.892 | 3.55 | 15.1 | 180 | 13 | 65 |

(a)Run time is 2¼ hours, productivity of kg/g/2¼ hours.
(b)Run time is 2 hours, productivity of kg/g/2 hours.
(c)Absolute pressures.

The effects of a low mixing temperature and a high treating temperature on the modified catalysts of the invention with respect to polymer particle size and attrition resistance are demonstrated in the results of the runs shown in Table 7 in which a low melt index polymer was produced and in invention runs 44–47 of Table 9C in which a relatively high melt index polymer was produced. It has been observed from past experience that grinding tests made on polymer formed with the catalysts of the present invention result in less coarse polymer (more fines) when the polymer melt index is above about 1. Also, a leveling effect appears to take place when the melt index ranges from about 5 to at least about 40. The amount of coarse polymer after grinding generally amounts from about 80 to about 95 wt.% for low melt index polymer and from about 60 to about 70 wt.% for high melt index polymer. Therefore, it is currently believed that a catalyst can be more accurately evaluated for potential commercial use (in absence of a commercial run) by preparing relatively high melt index polymer (about 5 L to 40 melt index) as compared to a low melt index polymer on a bench scale.

A comparison of the results of runs 39–42 with runs 44–47 of Table 9C shows in general that catalysts prepared by contacting a solution of $Ti(OR)_4$-$MgCl_2$ contained in a paraffin, e.g. n-hexane, with an organoaluminum compound at about room temperature or lower and treating the isolated particulate product with $TiCl_4$ at room temperature or higher produce relatively less coarse polymer (more fines) as compared to the preferred catalysts of the invention.

Thus, the preferred catalysts of this invention which produce large and attrition resistant polymer particles are formed by employing an aromatic solvent and low temperatures (0° C. to −100° C.) to produce catalyst A and an elevated temperature (80° C. to 180° C.) to produce catalyst B. The low temperatures utilized in preparing catalyst A is beneficial in reducing fines (increasing coarser polymer particles) in polymerization runs with the finished catalysts. The conditions favor the production of catalyst particles which are uniform in size and generally spherically shaped. An elevated temperature used to form catalyst B appears to set or harden catalyst A particles. The over-all effect results in a catalyst that is capable of producing large, attrition resistant polymer spheres at very high polymer productivities.

EXAMPLE X

A. Catalyst Preparation (Catalyst A and Catalyst B)

B. Polymerization in Presence of Hydrogen

A. As before all mixing and filtering operations were conducted in a dry box (in the essential absence of air, i.e., oxygen, and water) under a dry Argon atmosphere unless indicated otherwise.

A bottle was charged with 1.90 g (0.020 mole) of $MgCl_2$ and slurried in 50 ml of m-xylene and 13.66 g (0.040 mole) of titanium tetra-n-butoxide (abbreviated $Ti(OBu)_4$). The bottle was capped, and the slurry was heated for 1 hour beginning at 67° C. and ending at 120° C. to produce a solution containing a small amount of undissolved material. The solution was cooled to about 25° C. and to it was then added dropwise over a 43 minute period 30 ml (0.0234 mole) of 0.783 M EASC contained in n-heptane. The dark-colored slurry was stirred an additional 45 minutes at room temperature (about 25° C.) then the contents were suction filtered to give a dark yellow filtrate and a light brown filter cake. The filter cake was washed with 100 ml of n-hexane and dried under an Argon stream to yield 4.83 g of a light brown powder as catalyst A-23.

A bottle was charged with 2.0 g of catalyst A-23 and slurried in 10 ml of n-hexane. The bottle was capped and into it was injected 2.2 ml (3.8 g) of $TiCl_4$. The slurry was stirred for 1 hour at 91°–103° C., then the contents were suction filtered to give a red-yellow filtrate and a brown filter cake. The cake was washed with 50 ml of n-hexane and dried under an Argon stream to yield 1.85 g of a brown powder as catalyst B-23.

A bottle was charged with 7.60 g (0.0798 mole) of $MgCl_2$ and slurried in 20 ml of m-xylene and 27.10 g (0.0796 mole) of $Ti(OBu)_4$. The slurry was refluxed for 35 minutes and 40 ml of m-xylene added to it. After refluxing an additional 45 minutes, 100 ml of m-xylene was charged to the mixture. The resulting opaque, orange solution was cooled to room temperature, transferred to a capped vessel and treated dropwise over a 45 minute period with 100 ml (0.0783 mole) of the 0.783 M EASC solution. The resulting slurry was stirred for 30 minutes and then suction filtered yielding a dark red filtrate and a brown filter cake. The cake was washed with 100 ml of n-hexane and dried under an Argon stream to yield 15.11 g of light brown powder as catalyst A-24.

A bottle was charged with 2.0 g of catalyst A-24 and slurried in 20 ml of n-hexane. The bottle was capped and to it was injected 4.7 ml (8 g) of $TiCl_4$. The slurry was heated for 1 hour at a temperature beginning with 48° C. and ending with 104° C. The slurry was then cooled to about 25° C. and suction filtered to yield a brown filter cake. The cake was washed with 50 ml of n-hexane and dried under an Argon stream to yield 1.83 g of a yellow-brown powder as catalyst B-24.

A bottle was charged with 3.81 g (0.0400 mole) of $MgCl_2$ and slurried in 10 ml of m-xylene and 7.16 g (0.0210 mole) of $Ti(OBu)_4$. The slurry was heated for 40 minutes at from 120°–142° C. The almost clear solution was mixed with 100 ml of m-xylene and cooled to about 25° C. The solution was treated dropwise over 35 minutes with 25 ml (0.0196 mole) of the 0.783 M EASC solution. The resulting slurry was stirred for 25 minutes at about 25° C. and suction filtered to give a red filtrate and a dark-colored filter cake. The cake was washed with 110 mL of n-hexane and dried under an Argon stream to yield 6.54 g of a light purple powder as catalyst A-25.

A bottle was charged with 2.0 g of catalyst A-25 and slurried in 22 ml of n-hexane. The bottle was capped and into it was injected 4.7 ml (8 g) of $TiCl_4$. The bottle and contents were then heated 1 hour at 102°–105° C., cooled to about 25° C. and the contents suction filtered to produce an orange filtrate and a gray filter cake. The cake was washed with 50 ml of n-hexane and dried under an Argon stream to yield 1.87 g of a grayish powder as catalyst B-25.

A bottle was charged with 7.61 g (0.0799 mole) of $MgCl_2$ and slurried in 20 ml of m-xylene and 7.55 g (0.0222 mole) of $Ti(OBu)_4$. The slurry was stirred for 20 minutes at 141° C. and cooled to about 25° C. The resulting solid mass was taken up in 120 ml of m-xylene, forming a viscous, opaque syrup. After stirring the syrup for 30 minutes at 25° C., it was mixed with an additional 50 ml of m-xylene. The resulting still syrupy opaque solution was treated over a 11 minute period with 25 ml (0.0196 mole) of the 0.783 M EASC solution. The resulting slurry was stirred 26 minutes at about 25° C. and suction filtered to give a light yellow filtrate and a gray filter cake. The cake was washed with 100 ml of n-hexane and dried under an Argon stream to afford 11.13 g of a gray powder as catalyst A-26.

A slurry formed from 2.34 g of catalyst A-26 and 15 ml (25.7 g) of $TiCl_4$ was heated for 51 minutes at 100°–102° C. then cooled to about 25° C. and suction filtered to give a red filtrate and a light yellow filter cake. The cake was washed with 50 ml of n-hexane and dried under an Argon stream to yield 2.18 g of yellow powder as catalyst B-26.

A bottle was charged with 1.90 g (0.020 mole) of $MgCl_2$, 4.83 g (0.010 mole) of a commercially available cresyl titanate which was analyzed and found to have a 2:1 molar ratio of butyl to cresyl groups (cresyls being an orthopara mixture), and 20 ml of Soltrol® 130, a mixture of odorless mineral spirits having a boiling range of 176°–207° C. available from Phillips Petroleum Company, Bartlesville, Okla. The slurry was diluted with 20 ml of m-xylene and heated for 15 minutes at 125° C. At that time the resulting slurry was admixed with another 20 ml of m-xylene. After another 15 minutes at 125° C. still another 20 ml of m-xylene was added to the slurry resulting in the formation of a thick syrup. After heating an additional 55 minutes at 125° C., 70 ml of m-xylene were added and the mixture again heated at 125° C. for 20 minutes resulting in the formation of a dark red solution. The solution was cooled to about 25° C. and treated with 13 ml (0.0102 mole) of the 0.783 M EASC solution over a 5 minute period. The resulting dark colored slurry was stirred at about 25° C. for 1¼ hours and then suction filtered to yield a dark red filtrate and an orange filter cake. The cake was washed with 100 ml of n-hexane and dried under an Argon stream to yield 3.07 g of an orange powder as catalyst A-27.

A slurry formed from the catalyst A-27 powder, 35 ml of n-hexane and 7.5 ml (12.8 g) of $TiCl_4$ was stirred for 1 hour at 105° C. The slurry was cooled to about 25° C. and suction filtered to give a bright red filtrate and an orange-red filter cake. The cake was washed with 50 ml of n-hexane and dried under an Argon stream to yield 2.61 g of an orange-red powder as catalyst B-27.

A bottle was charged with 1.33 g (0.00976 mole) of $ZnCl_2$, 30 ml of n-hexane, 4.55 g (0.020 mole) of $Ti(OEt)_4$ and 20 ml of dry tetrahydrofuran (THF). The bottle and contents were heated to about 80° C. resulting in a two phase solution-slurry mixture. At that point, an additional 10 ml of THF was added which produced a solution. The solution was heated 10 more minutes at 80° C. then it was cooled to about 55° C. and treated over a 12 minute period with 33 ml (0.020 mole) of 0.6 M dibutylmagnesium dissolved in a n-heptane/n-hexane mixture. The resulting slurry was stirred for 48 minutes at about 55° C., cooled to about 25° C. and suction filtered to give a black filtrate and a dark green filter cake. The cake was washed with 100 ml of n-hexane and dried under an Argon stream to yield 5.52 g of a green powder as catalyst A-28.

A slurry formed from 2.0 g of catalyst A-28, 20 ml of n-hexane and 4 ml (6.9 g) of $TiCl_4$ was stirred for 1 hour at about 25° C. The resulting product was suction filtered to give a yellow filtrate and a brown filter cake. The cake was washed with 50 ml of n-hexane and dried under an Argon stream to yield 2.49 g of a light tan powder as catalyst B-28.

Before starting catalyst preparation using $MgBr_2$ it was necessary to dehydrate the commercially available $MgBr_2.6H_2O$ salt. A 500 ml flask was charged with 30 g of the hydrated salt and about 350-400 ml of absolute ethanol. The water was partly removed and the ethanol largely removed as the ethanol-water azeotrope by fractional distillation after which about 45 ml of n-heptane was added to the flask and the remaining portion of the water removed as the ternary water-ethanol-n-heptane azeotrope and the excess ethanol as the ethanol-n-heptane azeotrope. Distillation was stopped, the clear n-heptane removed by decanting and the remaining n-heptane removed under reduced pressure leaving behind a white solid as dehydrated $MgBr_2$. Actually the solid is an $MgBr_2$ alcoholate which was formed in the process.

A bottle was charged with 2.30 g (0.012 mole) of the $MgBr_2$ alcoholate and slurried with 40 ml of dry THF and 5.40 g (0.024 mole) of $Ti(OEt)_4$. The slurry was heated at 110° C. for 5 minutes producing a solution. The solution was then cooled to about 25° C. and treated over a 15 minute period with 40 ml (0.024 mole) of the 0.6 M dibutylmagnesium solution. The bottle with the slurry was heated to 60° C. and treated over a 13 minute period with another 40 ml of the 0.6 M dibutylmagnesium solution. The resulting slurry product was stirred 40 minutes more at 60° C., cooled to about 25° C., and suction filtered to give a dark colored filtrate and a black filter cake. The cake was washed with 100 ml of n-hexane and dried under an Argon stream to afford 5.05 g of a black powder as catalyst A-29.

A slurry formed from 2.0 g of catalyst A-29, 20 ml of n-hexane and 4 ml (6.9 g) of $TiCl_4$ was stirred for 1 hour at about 25° C. The slurry was then suction filtered to yield a pale yellow filtrate and a black filter cake. The cake was washed with 100 ml of n-hexane and dried under an Argon stream to yield 2.36 g of a black powder as catalyst B-29.

In order to demonstrate the reaction of alkyl zirconates with magnesium chloride the following experiment was performed. The catalytic activity of any precipitates was not pursued as the main purpose of the experiment was to demonstrate the occurrence of the above reaction between alkyl zirconates and magnesium chloride.

A bottle was charged with 1.53 g (0.016 mole) of $MgCl_2$, 14 ml (0.032 mole) of zirconium tetra-n-propoxide.2 n-propanol, and 90 ml of n-heptane. The bottle under a nitrogen purge was heated to reflux temperature and refluxed for 30 minutes producing a yellow solution containing a very small amount of an oil thought to be an impurity. The solution was cooled to about 25° C. and 30 ml of n-heptane were added as a precipitate was forming. A total solution resulted.

B-I. ETHYLENE POLYMERIZATION

The polymerization runs were conducted for 1 hour at 100° C. with an ethylene partial pressure of 1.38 MPa, a variable hydrogen charge near 0.3-0.7 mole in order to give the desired polymer melt index, and with 2 ml of 1 M TEA as a n-heptane solution as the cocatalyst.

The reactor was a 3.8 liter, stirred reactor, which was conditioned for each run by washing the interior with dry n-heptane under a nitrogen atmosphere at 150° C. After draining the heptane and purging with isobutane vapor and with the temperature of the interior about 25° C., the reactor was charged with the cocatalyst and then with the catalyst (weighed portions of 10-20 mg). The reactor port was closed, 2 liters of isobutane were added, the reactor temperature was raised to 100° C., the hydrogen was added and then the ethylene was charged.

The runs were terminated by venting the gases, cooling the reactor, and the polymer recovered, dried and weighed to determine the yields. Melt index values of the polymer samples are determined in accordance with ASTM D 1238-65T, Condition E.

The results are presented in Table 10A.

B-II. ETHYLENE/1-BUTENE-POLYMERIZATION

The polymerization runs were conducted for 1 hour at 90° C. with an ethylene/1-butene partial pressure of 0.69 MPa and a hydrogen charge of 0.17 mole and a total reactor pressure of 2.38 MPa. 1 ml of 1 M TEA was used as cocatalyst in each run. After the reaction was charged with isobutane, 49 g 1-butene were pumped into the reactor. The remaining components were then charged in the same order and the polymer isolated in the same manner described for ethylene polymerization. Melt index values are determined in accordance with ASTM D 1238-65T, Condition E. Density values are determined in accordance with ASTM D 1505-68.

TABLE 10A

Ethylene Polymerization

| Run No. | Catalyst No. | Ti(OR)$_4$ R | Mole Ratio Ti(OR)$_4$:MgCl$_2$ | Productivity kg/g/hour[a] | Polymer Melt Index |
|---|---|---|---|---|---|
| 48 | B-24 | n-butyl | 1:1 | 41.8 | 1.4 |
| 49 | " | " | " | 33.6 | 1.0 |
| 50 | B-25 | " | 1:2 | 85.3 | 0.13 |
| 51 | " | " | " | 80.5 | 0.60 |
| 52 | B-26 | " | 1:4 | 123.0 | 0.17 |
| 53 | " | " | " | 97.0 | 0.07 |
| 54 | B-27 | n-butyl/cresyl | 1:2 | 174.0 | low[b] |
| 55 | " | " | " | 166.0 | 0.08 |
| 56 | " | " | " | 172.0 | 0.05 |
| 57 | " | " | " | 154.0 | 1.0 |

Notes:
[a] kilograms polymer per g catalyst per hour
[b] too low to measure

TABLE 10B

Ethylene/1-Butene Copolymerization

| Run No. | Catalyst No. | Ti(OR)$_4$ R | MX$_2$ | Ti(OR)$_4$:NX$_2$ Mole Ratio | Productivity kg/g/hour[a] | Polymer MI | Density g/mL |
|---|---|---|---|---|---|---|---|
| 58 | B-23 | n-butyl | MgCl$_2$ | 2:1 | 46.5 | 4.1 | 0.9352 |
| 59 | B-28 | ethyl | ZnCl$_2$ | " | 26.2 | 1.8 | 0.9414 |
| 60 | B-29 | " | MgBr$_2$ | " | 5.10 | 1.4 | 0.9391 |

Notes:
[a] kilogram polymer per g catalyst per hour

The results given in Example 10 and in Tables 10A, 10B demonstrated that active ethylene homo- and copolymerization catalysts are made according to the teachings of this invention.

The results given in Tables 10A, 10B, based on the catalysts prepared as described in Example 10, demonstrate that active catalysts for ethylene homopolymerization and ethylene/1-olefin copolymerization results by following the teaching of this invention. The catalysts are derived by contacting a solution of the specified titanium tetrahydrocarbyloxide metal dihalide composition with the specified organometal compound as a precipitating agent and treating the resulting precipitated composition with TiCl$_4$ to form the most active form of the invention catalysts (catalyst B). In some instances, depending upon the nature of the metal halide and the initial composition comprising the metal halide and the titanium compound, it is necessary to use a polar solvent or a mixture of a polar and nonpolar solvent. It is believed that the selection of the solvent to employ is well known to those skilled in this art or can be readily determined by them.

EXAMPLE XI

Catalyst Preparation

As before all mixing and filtering operations were conducted in a dry box under a nitrogen atmosphere employing dry n-heptane as the reaction medium. Anhydrous magnesium dichloride (MgCl$_2$) and titanium tetraethoxide [abbreviated Ti(OEt)$_4$] were charged to a vessel equipped for stirring and refluxing.

To a vessel was charged 3.88 g (0.041 mole) of MgCl$_2$, 18.20 g of 85% pure Ti(OEt)$_4$ (equivalent to 0.0679 mole of 100% alkoxide) and 200 ml of n-heptane. The vessel was capped and removed from the box and heated while stirring for 35 minutes at about 96° C. to obtain a solution. The solution was cooled to about room temperature (25° C.) and while stirring, 7.55 ml (0.079 mole) of VOCl$_3$ as a precipitating agent was charged by syringe to the vessel in less than about 3 minutes resulting in the formation of a voluminous, white precipitate. The slurry was stirred an additional 30 minutes. The vessel was returned to the dry box, its contents were suction filtered and the cake washed with 50 ml of dry n-hexane (in small portions), then dried under an argon stream to afford 10.0 g of a white powder. (Catalyst A-30).

While in the dry box a vessel was charged with 2.0 g of the white powder and slurried with 10 ml of n-hexane. The vessel was capped, removed from the box, injected with 2.2 ml (3.8 g, 0.020 mole) of TiCl$_4$, and heated for 40 minutes at about 100° C. with stirring. Stirring and heating were discontinued and the vessel and contents cooled to room temperature and returned to the dry box. The contents were suction filtered, the filter cake washed with 50 ml of dry n-hexane, and dried under an argon stream to yield 1.28 g of a white powder as the catalyst. (Catalyst B-30).

The catalyst was analyzed and found to contain 13.96 wt.% Ti, 11.4 wt.% Mg, 0.11 wt.% V, 39.5 wt.% Cl, 15.81 wt.% C, 4.56 wt.% H and by difference, 14.66 wt.% O.

To a vessel was charged 2.856 g (0.0300 mole) of MgCl$_2$, 13.673 g (0.0600 mole) of Ti(OEt)$_4$ and 150 ml of n-heptane. The vessel was removed from the box and while under a dry nitrogen purge it was refluxed, while stirring, for about 1 hour. The vessel and contents were cooled to room temperature, returned to the dry box and suction filtered. The filter was rinsed with 10 ml of n-heptane. A portion of the filtrate, 49.5 ml was charged to a vessel which was capped and removed from box and charged by syringe with 2.2 ml (0.020 mole) of TiCl$_4$ at room temperature. The mixture was stirred while at room temperature for about 4 hours. The vessel was then returned to the dry box where its contents were suction filtered. The filter cake was washed with 50 ml of dry n-hexane and dried under a nitrogen stream to afford 6.170 g of a white powder. (Catalyst A-31). This catalyst was not subsequently treated with TiCl$_4$ to produce a corresponding Catalyst B-31 composition.

To a vessel was charged 3.80 g (0.0399 mole) of MgCl$_2$, 18.20 g of 85 wt.% Ti(OEt)$_4$ in n-hexane (equivalent to 0.0679 mole alkoxide) and 100 ml of m-xylene. the vessel was capped, removed from the dry box and heated with stirring at 105° C. for 30 minutes to obtain a solution. The solution was cooled to about 25° C. and treated dropwise with 10 ml (0.0872 mole) of SiCl$_4$ diluted in 30 ml of m-xylene over a 30-minute period, using a needle valve to introduce the solution. The vessel containing a lemon-colored slurry was transferred to the dry box where the slurry was suction filtered. The white filter cake was washed with 100 ml of dry n-hexane and dried under an argon stream to yield 5.44 g of a white powder. (Catalyst A-32).

While in the dry box, 2.00 g of the white catalyst A-32 above was charged to a vessel, slurried with 10 ml n-hexane, the vessel capped and removed from the box. The vessel was then injected with 2.2 ml (3.8 g, 0.020 mole) of TiCl$_4$ and heated for about 40 minutes at 95° C. with stirring. Stirring and heating were discontinued, the vessel and contents cooled to room temperature and returned to the dry box. The contents were suction filtered, the filter cake washed with 50 ml of dry n-hexane and dried under an argon stream to afford 2.0 g of a white powder as the catalyst (B-32).

The catalyst was analyzed and found to contain 2.1 wt.% Ti, 21.6 wt.% Mg, 0.13 wt.% Al, 8.8 wt.% Cl, 1.9 wt.% Si, the balance being C, H, and O which was not determined.

The catalyst B-32 has not been used to polymerize any monomer. Based on the analyzed results showing the presence of titanium and by analogy with other related titanium-containing catalysts of this invention there is no doubt but that it would be an active 1-olefin polymerization catalyst.

EXAMPLE XII

Ethylene Polymerization

A 3.8 liter, stirred, stainless steel reactor as described and conditioned in Example IV was employed for ethylene polymerization.

The conditioned reactor in each run was purged with dry isobutane, 1 cc of triethylaluminum cocatalyst solution (1 molar in n-heptane) was charged followed by addition of the catalyst. The reactor was closed, about 2 liters of dry isobutane was added to it, the reactor and contents were heated to the indicated temperature, ethylene and hydrogen, if used, were charged and the run was started. Each run was conducted for 60 minutes. Each run was terminated and the polymer recovered as described in Example IV.

In run 61, the initial ethylene pressure was 0.79 MPa (115 psia) and no hydrogen was present. In run 62 the initial ethylene pressure was 1.5 MPa (215 psia) and the initial hydrogen pressure was 0.45 MPa (65 psia).

The quantity of each catalyst employed, conditions used, and results obtained are presented in Table 12.

TABLE 12

Ethylene Polymerization

| Run No. | Catalyst No. | Weight,g | Reactor Temp. °C. | Pressure, total,MPa | Polymer Yield, g | Calculated Productivity kg/g/hr |
|---|---|---|---|---|---|---|
| 61 | A-31 | 0.0154 | 80 | 2.00 | 70 | 4.55 |
| 62 | B-30 | 0.0175 | 100 | 3.37 | 440 | 25.1 |

The results obtained are generally in line with those for the other invention catalysts employing the specific organoaluminum compounds as the precipitating agent. The results indicate that the scope of the precipitating agents usefully employable in this invention can be as earlier described.

I claim:

1. A method of producing a catalyst comprising forming a first catalyst component by reacting
   (A) a metal halide selected from the group consisting of metal dihalides and metal hydroxyhalide compounds of Group IIA and IIB, and
   (B) a transition metal compound wherein the transition metal is tatanium and the transition metal is bonded to at least one radial selected from the group consisting of hydrocarbyl oxides, imides, amides, and mercaptides; and
   reacting a solution of said first catalyst component with a second catalyst component selected from the group consisting of (a) organometallic compounds of Groups I, II, and III selected from the group consisting of lithium alkyls, Grignard reagents, dialkyl magnesium compounds, dialkyl zinc compounds, and hydrocarbyl aluminum halides; (b) metal halides and oxyhalides of metals of Groups IIIA, IVA, IVB, and VB; (c) hydrogen halides; and (d) organic acid halides selected from the group consisting of compounds having the formula

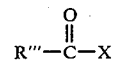

wherein R''' is an alkyl, aryl, or cycloalkyl group or combination thereof and X is a halide; and then treating the solid product resulting from the combination of said first and second catalyst components with a titanium tetrahalide capable of enhancing the activity of said catalyst.

2. A method according to claim 1 wherein the transition metal compound is selected from the group consisting of titanium tetrahydrocarbyl oxides, titanium tetraimides, titanium tetraamides, titanium tetramercaptides, and wherein the metal dihalide compound is selected from the group consisting of beryllium dichloride, beryllium dibromide, magnesium dichloride, magnesium difluoride, calcium dichloride, calcium dibromide, zinc dichloride, and zinc difluoride, and wherein said second catalyst component is selected from the group consisting of organometallic compounds of Groups I, II, and III selected from the group consisting of lithium alkyls, Grignard reagents dialkyl magnesium compounds, dialkyl zinc compounds, and hydrocarbyl aluminum halides.

3. A method according to claim 2 wherein the transition metal compound is a titanium compound represented by the general formula $Ti(OR)_4$ wherein each R is individually selected from an alkyl, cycloalkyl, aryl, alkaryl, aralkyl hydrocarbon radicals containing from 1 to about 20 carbon atoms per radical and each R can be the same or different.

4. A method according to claim 3 wherein each R is individually selected from alkyl radicals containing 1 to 10 carbon atoms per radical.

5. A method according to claim 4 wherein said metal halide is selected from magnesium dichloride, magnesium dibromide, and zinc dichloride.

6. A method according to claim 5 wherein said titanium tetrahalide is titanium tetrachloride.

7. A method according to claim 6 wherein said metal halide is magnesium dichloride.

8. A method according to claim 7 wherein said second catalyst component is selected from the group consisting of hydrocarbylaluminum halides represented by the formulas $R'AlX_2$, $R'_2AlX$, and $R'_3Al_2X_3$ wherein each R' is individually selected from linear and branched chain hydrocarbyl radicals containing 1 to 20 carbon atoms per radical and each R' can be the same or different, and X is a halogen atom.

9. A method according to claim 8 wherein said second catalyst component comprises ethylaluminum sesquichloride.

10. A method according to claim 9 wherein said transition metal compound of said first catalyst component is titanium tetraethoxide.

11. A method according to claim 10 wherein the reaction between (A) and (B) to form said first catalyst component is conducted in a hydrocarbon solvent, the first and second catalyst components are contacted together at a temperature within the range of about −100° C. to about 0° C., and the solid product resulting from the combination of said first and second catalyst components is contacted with titanium tetrachloride at a temperature in the range of about 80° C. to about 180° C.

12. A method according to claim 11 wherein said first and second catalyst components are contacted together at a temperature in the range of about −15° C. to about −40° C.

13. A method according to claim 12 wherein said hydrocarbon solvent is aromatic and the treatment with titanium tetrachloride is conducted at a temperature in the range of about 100° C. to about 130° C.

14. A method according to claim 13 wherein the solvent for said first catalyst component consists essentially of an aromatic hydrocarbon.

15. A method according to claim 14 wherein said solvent is xylene.

16. A method according to claim 15 wherein the molar ratio of the transition metal of the transition metal compound of the first catalyst component to the metal of the metal halide compound of the first catalyst component is from about 10:1 to about 1:10 and the molar ratio of the transition metal of the transition metal compound of the first catalyst component to the second catalyst component is from about 10:1 to 1:10.

17. A method according to claim 11 wherein the molar ratio of the transition metal of the transition metal compound of the first catalyst component to the metal of the metal halide compound of the first catalyst component is from about 10:1 to about 1:10 and the molar ratio of the transition metal of the transition metal compound of the first catalyst component to the second catalyst component is from about 10:1 to 1:10.

18. A method according to claim 17 wherein the molar ratio of the transition metal of the transition metal compound of the first catalyst component to the metal of the metal halide compound of the first catalyst component is from about 2:1 to 1:2 and the molar ratio of the transition metal of the transition metal compound of the first catalyst component to the second catalyst component is from about 2:1 to 1:3.

19. A method according to claim 7 wherein said transition metal compound of said first catalyst component is titanium tetra-n-butoxide.

20. A method according to claim 19 wherein said second catalyst component is selected from the group consisting of hydrocarbylaluminum halides represented by the formulas R'AlX$_2$, R'$_2$AlX, and R'$_3$Al$_2$X$_3$ wherein each R' is individually selected from the linear and branched chain hydrocarbyl radicals containing 1 to 20 carbon atoms per radical and each R' can be the same or different, and X is a halogen atom.

21. A method according to claim 8 wherein said transition metal compound of said first catalyst component is an orthopara cresyl titanate, wherein the molar ratio of butyl radicals to cresyl radicals is about 2:1.

22. A method according to claim 8 wherein said transition metal compound is titanium tetra-n-butoxide.

23. A method according to claim 7 wherein said precipitating agent is a dialkyl magnesium compound.

24. A method according to claim 17 wherein the molar ratio of the transition metal of the transition metal compound of the first catalyst component to the metal of the metal halide compound of the first catalyst component is from about 2:1 to 1:2 and the molar ratio of the transition metal of the transition metal compound of the first catalyst component to the second catalyst component is from about 2:1 to 1:3.

25. A catalyst comprising a product of any one of claims 1, 2 and 14 through 24.

26. A catalyst according to claim 25 further comprising a cocatalyst comprising at least one organoaluminum compound represented by the general formulas R"$_3$Al R"AlX$_2$ R"$_2$AlX R"$_3$Al$_2$X$_3$ wherein each R" is individually selected from linear and branched chain hydrocarbyl radicals containing 1 to about 20 carbon atoms and each R" can be the same or different and X is a halogen atom.

27. A catalyst according to claim 26 wherein said cocatalyst is triethylaluminum and wherein the weight ratio of said cocatalyst to said titanium-containing catalyst is in the range of about 4:1 to about 40:1.

28. A catalyst according to claim 25 wherein the product of the reaction of (A) and (B) if isolated in a substantially crystalline form has a powder X-ray diffraction pattern, taken under conditions to exclude the presence of air and water, with interplanar spacings and relative intensities as follows:

| interplanar spacing (meter × 10$^{-10}$) | relative intensity of spectrum |
| --- | --- |
| 10.77 | weak |
| 10.47 | very strong |
| 9.28 | very weak |
| 8.73 | weak |
| 8.23 | very strong |
| 8.10 | moderate |
| 7.91 | very strong |
| 7.43 | strong |
| 7.27 | strong |
| 6.52 | weak |
| 6.41 | weak |
| 6.10 | weak |
| 4.90 | very weak |
| 4.42 | very weak |
| 4.40 | very weak |
| 4.09 | very weak |
| 3.86 | very weak |

29. A catalyst produced according to a process of claim 7 wherein said second catalyst component is vanadium oxytrichloride.

30. A catalyst produced according to a process of claim 7 wherein said second catalyst component is dibutylmagnesium.

31. A catalyst produced according to a process of claim 7 wherein said second catalyst component is silicon tetrachloride.

* * * * *

UNITED STATES PATENT AND TRADEMARK OFFICE
CERTIFICATE OF CORRECTION

PATENT NO. : U.S. 4,363,746
DATED : December 14, 1982
INVENTOR(S) : Charles E. Capshew It is certified that error appears in the above-identified patent and that said Letters Patent are hereby corrected as shown below:

Column 31, line 57, delete "tatanium" and insert therefor --- titanium ---.

Column 32, line 29, after "reagents" insert --- , ---.

Signed and Sealed this

First Day of March 1983

[SEAL]

Attest:

Attesting Officer

GERALD J. MOSSINGHOFF

Commissioner of Patents and Trademarks